United States Patent [19]

Bahn

[11] Patent Number: 5,097,191
[45] Date of Patent: Mar. 17, 1992

[54] RELUCTANCE TYPE ELECTRIC MOTOR
[75] Inventor: Itsuki Bahn, Tokyo, Japan
[73] Assignee: Kabushikigaisha Sekogiken, Tokyo, Japan
[21] Appl. No.: 635,622
[22] PCT Filed: Apr. 27, 1990
[86] PCT No.: PCT/JP90/00564
§ 371 Date: Feb. 11, 1991
§ 102(e) Date: Feb. 11, 1991
[87] PCT Pub. No.: WO90/13941
PCT Pub. Date: Nov. 15, 1990
[30] Foreign Application Priority Data
May 2, 1989 [JP] Japan ............... 63-112127
[51] Int. Cl.$^5$ .................................. H02P 5/40
[52] U.S. Cl. .................................. 318/701
[58] Field of Search ............ 318/701, 138, 254, 696
[56] References Cited

U.S. PATENT DOCUMENTS

| | | | |
|---|---|---|---|
| 4,868,478 | 9/1989 | Hedlund et al. | 318/701 |
| 4,933,621 | 6/1990 | MacMinn et al. | 318/701 |
| 5,043,643 | 8/1991 | Hedlund et al. | 318/701 |

Primary Examiner—David Smith, Jr.
Attorney, Agent, or Firm—Staas & Halsey

[57] ABSTRACT

A reluctance type electric motor, in which, when the first excitation coil being energized is discontinued of energizing, a reverse current prevention diode is provided to prevent the discharging electric power of the magnet energy of the first excitation coil from returning to DC power source so as to change accumulated magnetic energy into the magnetic energy of the second excitation coil to be energized next, and to quickly discharge the magnetic energy of the first excitation coil and as well as to quickly accumulate the magnetic energy of the second excitation coil. Furthermore, the magnetic energy of the first excitation coil is charged into a small capacity capacitor to obtain high voltage, the magnetic energy of the second excitation coil is accumulated by utilizing such high voltage, and the magnetic energy is quickly discharged and accumulated so as to prevent generation of the reduced torque and counter torque. As a result of above, it is possible to obtain a highly efficient reluctance type electric motor high rotates at high speed even if the applied voltage is low.

4 Claims, 15 Drawing Sheets

RELUCTANCE TYPE ELECTRIC MOTOR

INDUSTRIAL FIELD OF THE INVENTION

The present invention relates to a reluctance type electric motor which can be driven at low voltage.

BACKGROUND OF THE INVENTION

Traditionally, the reluctance type electric motor has been capable of providing large output torque but involved increased applied voltage. For example, even the applied voltage of a reluctance type electric motor of 100 watt output was 100 volts or over.

In an example of such traditional reluctance type electric motor of above, if the applied voltage is low of about 20 volts for example, the speed of rotation was reduced and the utility was lost.

Further, the speed was lowered, and if the speed was increased, then the efficiency was considerably deteriorated.

In other words, the magnetic path of the excitation coil of the reluctance type electric motor is closed by the magnetic pole and the salient pole, so that the inductance of the excitation coil of the reluctance type electric motor is considerably larger than that of the armature coil of well-known magnet armature.

Therefore, the output torque increases. However, because it takes time to accumulate and to discharge the magnetic energy that is accumulated in the excitation coil, the reduced torque and the counter torque result because the width between the leading edge and the falling portion of the excitation current increases.

Therefore, the speed of rotation of the motor is reduced extremely. There is no means but to increase the applied voltage in order to obtain high efficiency at high motor speed rotation. An object of the present invention is therefore to provide a highly efficient reluctance type electric motor which turns at high speed on the low applied voltage.

DISCLOSURE OF THE INVENTION

In accordance with the present invention, the circuit thereof comprises a first means which converts the accumulated magnetic energy into the magnetic energy of a second exitation coil to be energized next when the current supplied to a first excitation coil is shut off, thereby to quickly discharge the magnetic energy of the first excitation coil and to accumulate the magnetic energy of the second excitation coil.

Therefore, a reverse current prevention diode is provided to prevent the flow back of the foregoing discharged electric power to the DC power source.

Then, when the electric current supply to the first excitation coil and the second excitation coil is changed instantaneously without a time delay, the first means stated above will do. However, when a certain time delay is involved and if the magnetic energy of the first excitation coil is charged into a small capacity capacitor to obtain high voltage for accumulating the magnetic energy of the second excitation coil, the discharging and accumulation of the magnetic energy become quick and the occurrence of the reduced torque and counter torque is prevented.

For this reason, a reverse current prevention diode and a capacitor of small capacity are provided as a means to prevent the foregoing conditions.

Further, when the magnetic energy accumulated in the first excitation coil is discharged, it results in a loss of Joule heat due to the resistance of the excitation coil, that is, the loss of copper and the loss of iron.

Therefore, because the discharged magnetic energy is reduced by a fixed amount, the start-up of the excitation current may not be sufficient. It stands to reason that the copper loss and iron loss of the second excitation coil will have similar influence on the start-up of the excitation current.

In order to remove such inconvenience, a means is provided which increases the current value of the final period by a fixed value than the current value of the initial period (the current value when the start-up is completed) respectively of the excitation current of the excitation coil.

Because the current value of the final period of the excitation current of the first excitation coil is increased by a fixed value, the accumulated magnetic energy is also increased accordingly.

This magnetic energy is converted into the magnetic energy of the second excitation coil through or not through a small capacity capacitor, and there is an action that the height of the start-up of the excitation current of the secon excitation coil can be sufficiently made large even if the copper loss and iron loss are caused.

Therefore, the reduced torque can be prevented. Also, the speed of the annihilation of the magnetic energy of the first excitation coil is increased thereby the occurrence of the counter torque is prevented.

The reason that the speed of rotation of the reluctance type electric motor is small is attributable to the occurrence of the foregoing reduced torque and counter torque, and there is provided an action which can remove the defects of this type of electric motor.

Because the foregoing removal of the reduced torque and counter torque is carried out without regard to the supply voltage, the reluctance type electric motor has an action which can obtain highly efficient speed of rotation than a general DC machine, in particular than a brushless electric motor even when the applied voltage is low.

The present invention has the following effects as a result of above.

Because the supply and conversion of large magnetic energy of the adjoining excitation coils where the current supply is changed can be carried out quickly, the low rotational speed which is a defect of the reluctance type electric motor is prevented, while achieving high speed of rotation as well as high efficiency.

When a general means is used, the energizing waveform of the excitation coil is gradually increased and decreased due to large inductance, causing the reduced torque and counter torque. Thus a means which employs high voltage for the applied voltage is adopted.

Therefore, the driving becomes difficult if a battery power source of a motor car is used.

According to the present invention, the processing of large accumulated magnetic energy of the excitation coil has no connection with the applied voltage and the applied voltage is simply required to exceed the counter electromotive force and such processing can be carried out based on the concept similar to that of well-known DC electric motor. Thus low applied voltage is composed.

An energizing control circuit of single phase (FIG. 6 (a)) is divided into a phase A and aphase B, so that the control means of the excitation coil is simplified as stated above and an electric motor can be made into a machine of high speed and high efficiency by additionally providing a diode and a capacitor on the power source side for prevention of reverse current.

THE BEST MODE TO PRACTISE THE INVENTION

The present invention will now be described with respect to the embodiments thereof by referring to the accompanying drawings.

The following angles indicated represent electrical angles.

Figure 1:
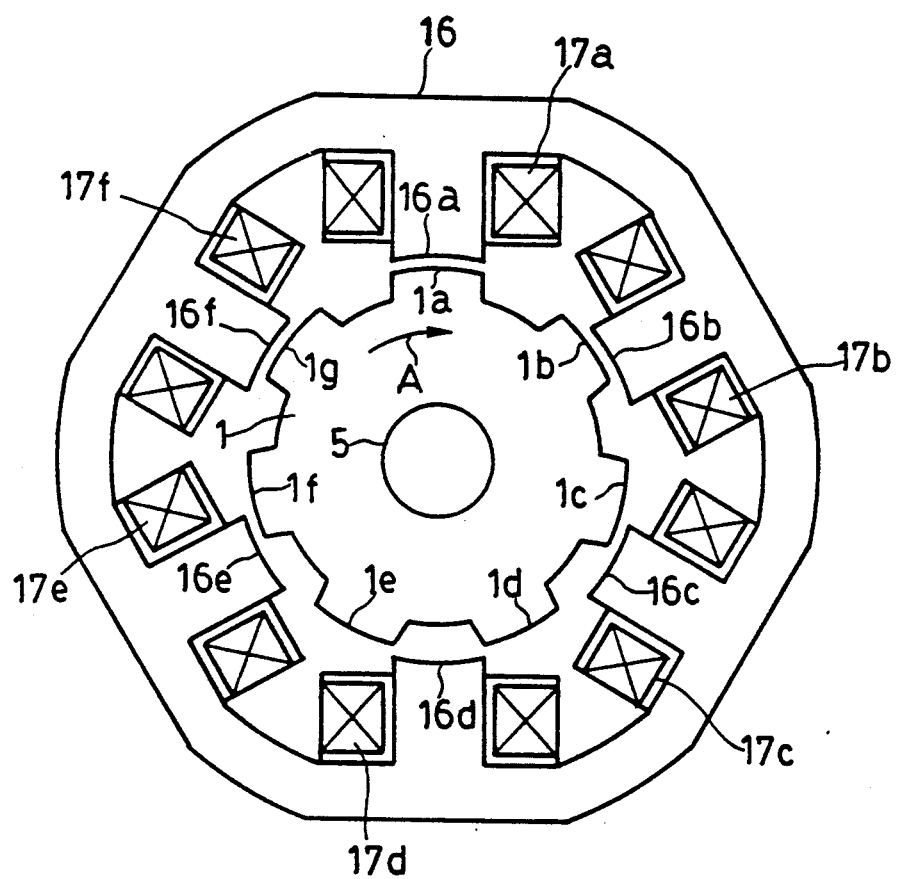
FIG. 1 (a) is an explanatory drawing of a 3 phase reluctance type electric motor according to the present invention, FIG. 1 (b) is an explanatory drawing of a 2 phase reluctance type electroc motor according to the present invention, FIGS. 2 (a), (b) is a development of a rotor and a armature which constitutes the present invention, FIG. 3 and FIG. 4 denote an electric circuit diagram to obtain position detecting signals from the coil, FIGS. 5 (a), (b), (c) are a time chart showing position detecting signals and excitation current to be obtained from the coil, FIG. 5 (d) is an explanatory drawing illustrating a processing of the magnetic energy of the excitation coil, FIGS. 6 (a), (b), (c), (d) are a energizing control circuit of the excitation coil.
Figure 1:
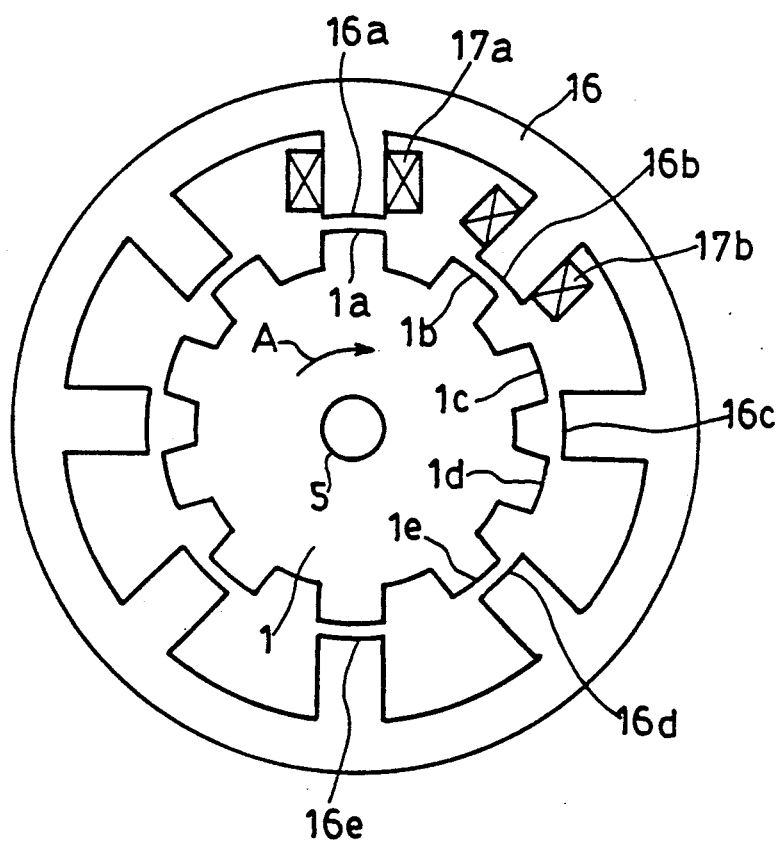

FIG. 1 (a) represents an embodiment of a 3 phase reluctance type electric motor to which the present invention is applied and is a plan view showing the construction of the salient pole of the rotor, magnetic pole and excitation coil of the stationary armature thereof.

The rotor 1 has a salient pole 1a, 1b, . . . , the width of the salient pole 1a, 1b, . . . is 180 degrees and each sailient pole is arranged with 360 degrees phase difference at equally spaced pitches.

The rotor 1 is composed by a well-known meansmade with laminated silicon steel plates and rotates round the rotation shaft as a shaft center. The stationary armature 16 is arranged with the magnetic pole 16a, 16b, . . . at equal intervals with the width thereof being 180 degrees. The width of the salient pole 1a, 1b, . . . and the magnetic pole 16a, 16b, . . . is 180 degrees, and the salient poles are arranged at equal intervals.

Figure 2:
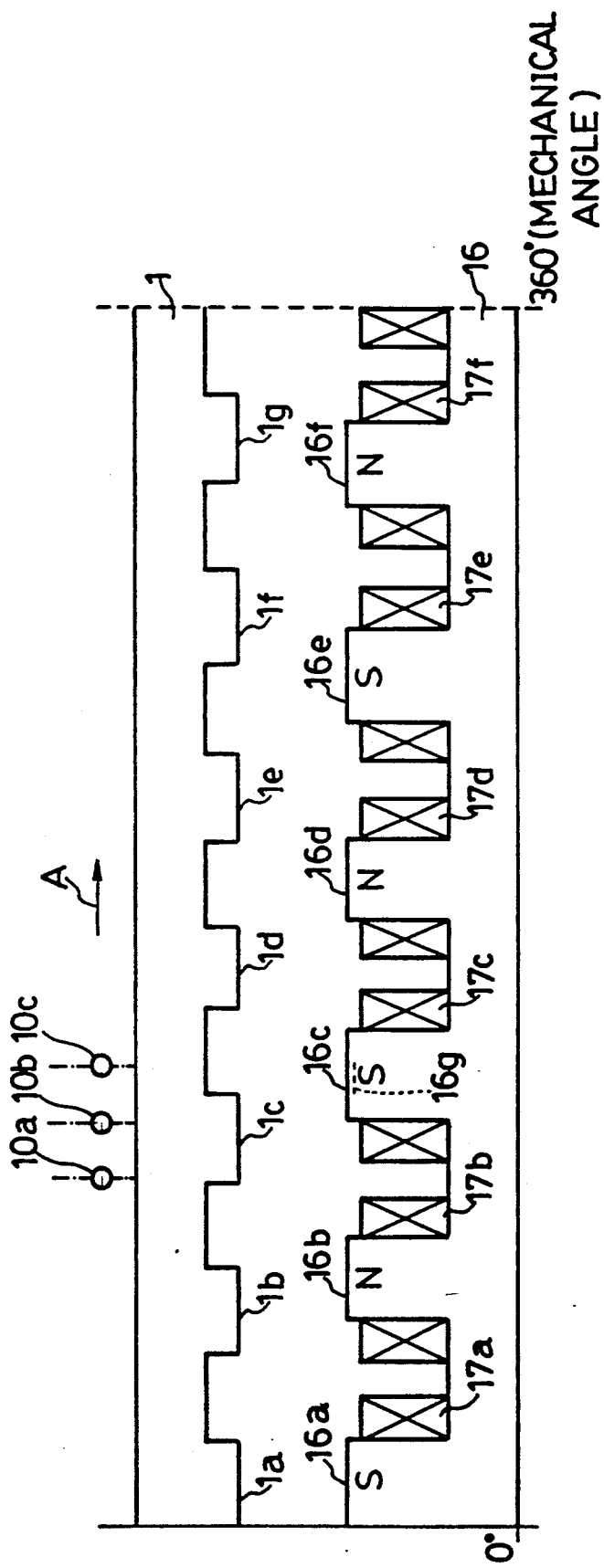
Figure 2:
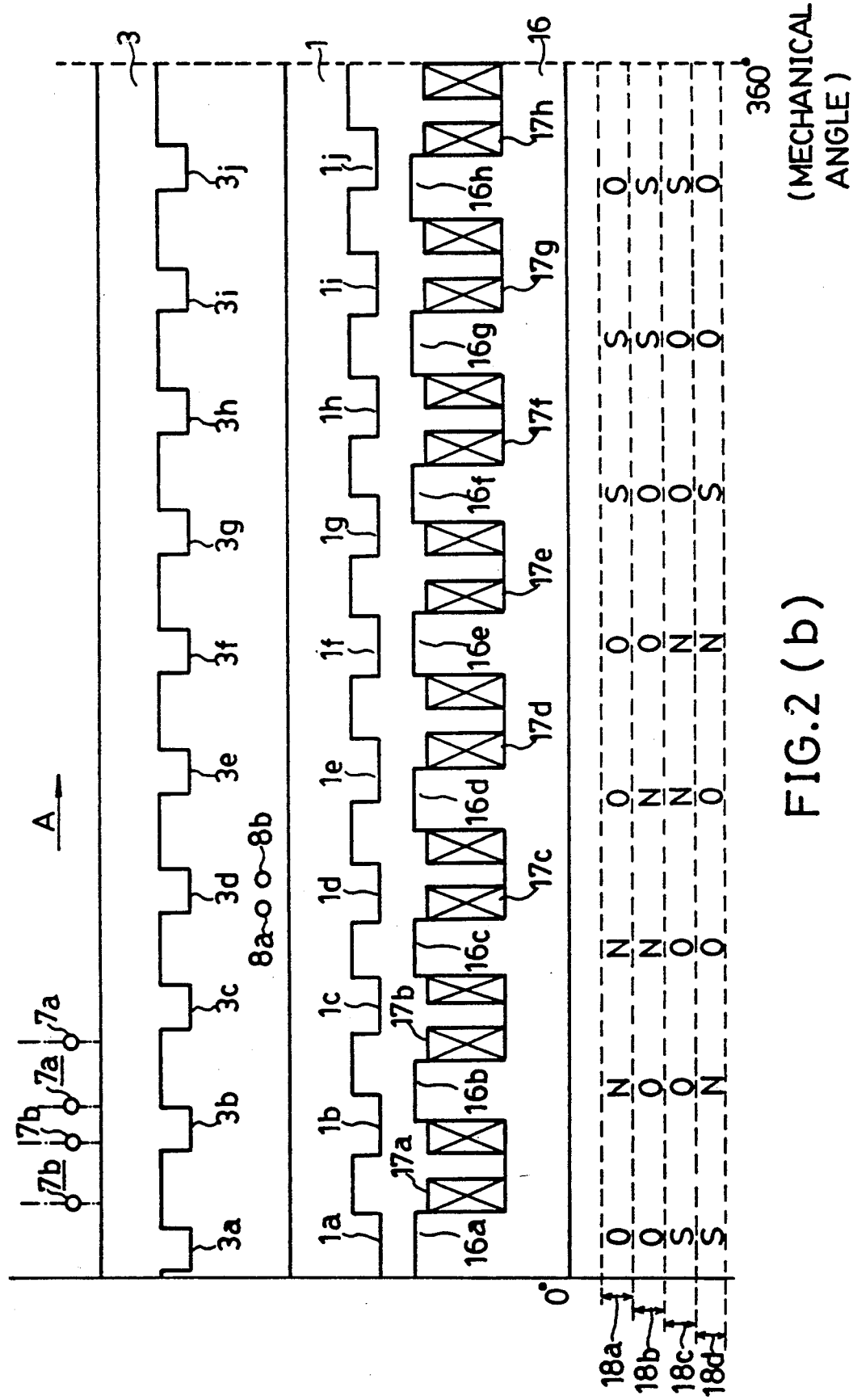

In the present embodiment, seven salient poles 1a, 1b, . . . and six magnetic poles 16a, 16b, . . . are provided. FIG. 2 (a) is a development of the reluctance type 3 phase electric motor of FIG. 1 (a).

The coil 10a, 10b, 10c is a position detection element to detect the positions of the salient poles 1a, 1b, . . . , and the coil is a hollow structure of about 100 turns with its diameter being 5 mm.

Further, the coil is fixed at the position shown in the diagram being apart 120 degrees on the side of the stationary armature 16 and the coil surface opposes on the side of the salient pole 1a, 1b, . . . by means of an opening.

Figure 4:
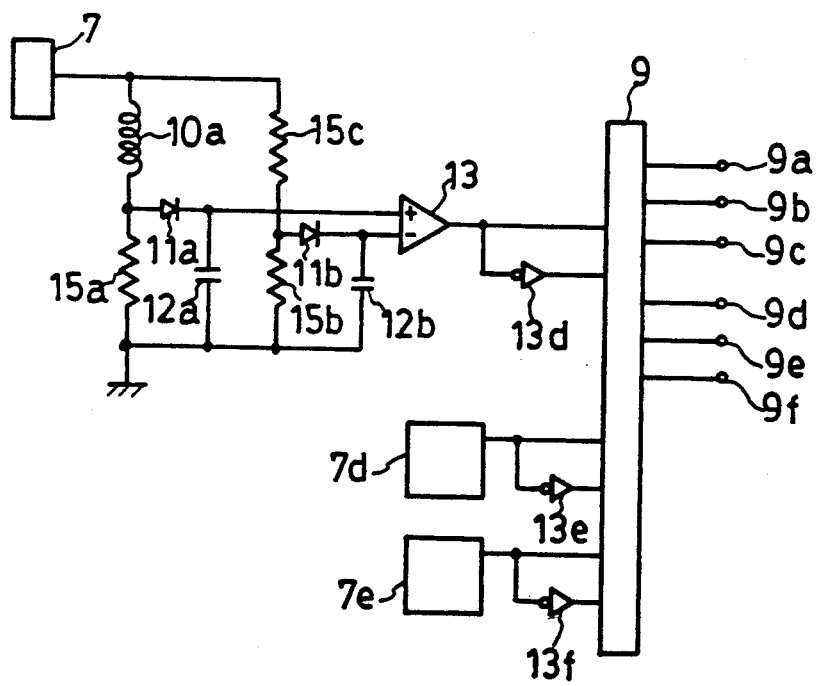

In FIG. 4, a device for obtaining position detection signals from the coil 10a, 10b, 10c is shown.

The coil 10a, resistor 15a, 15b, 15c compose a bridge circuit and are adjusted to balance when the coil 10a is not opposed to the salient pole 1a, 1b, . . . .

Therefore, the output of the low pass filter comprising the diode 11a, capacitor 12a, and the diode 11b, capacitor 12b is equal, while the output of the operational amplifier 13 becomes low level.

The oscillator 7 oscillates about one megacycle.

When the coil 10a is opposed to the salient pole 1a, 1b, . . . , the impedance is reduced due to the iron loss (eddy current loss and hysteresis loss), causing the increased voltage drop of the resistor 15a and the increased output level of the operational amplifier 13.

Figure 9:
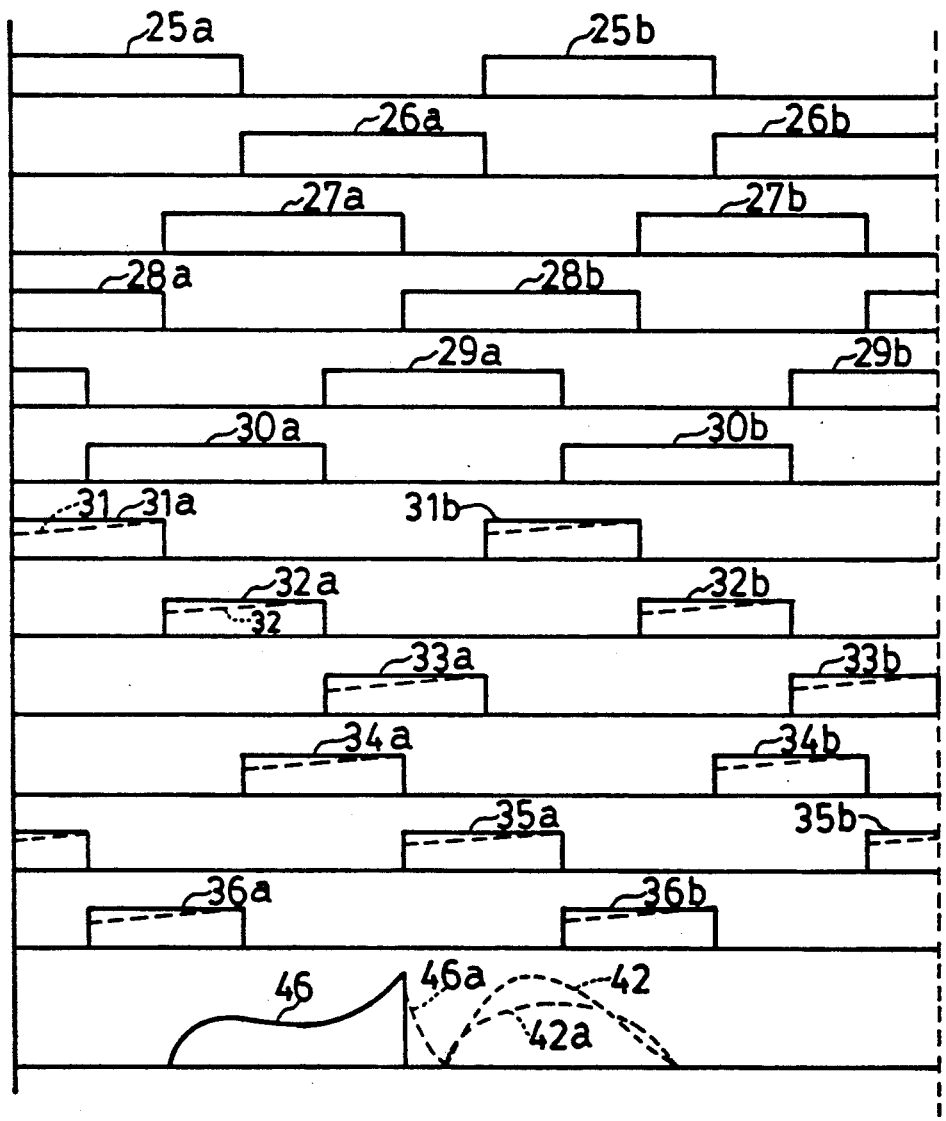
Figure 9:
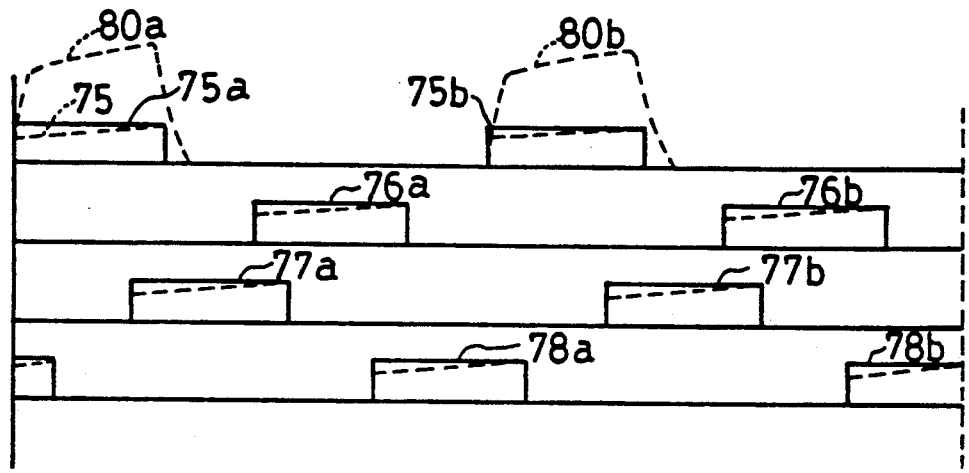
Figure 9:
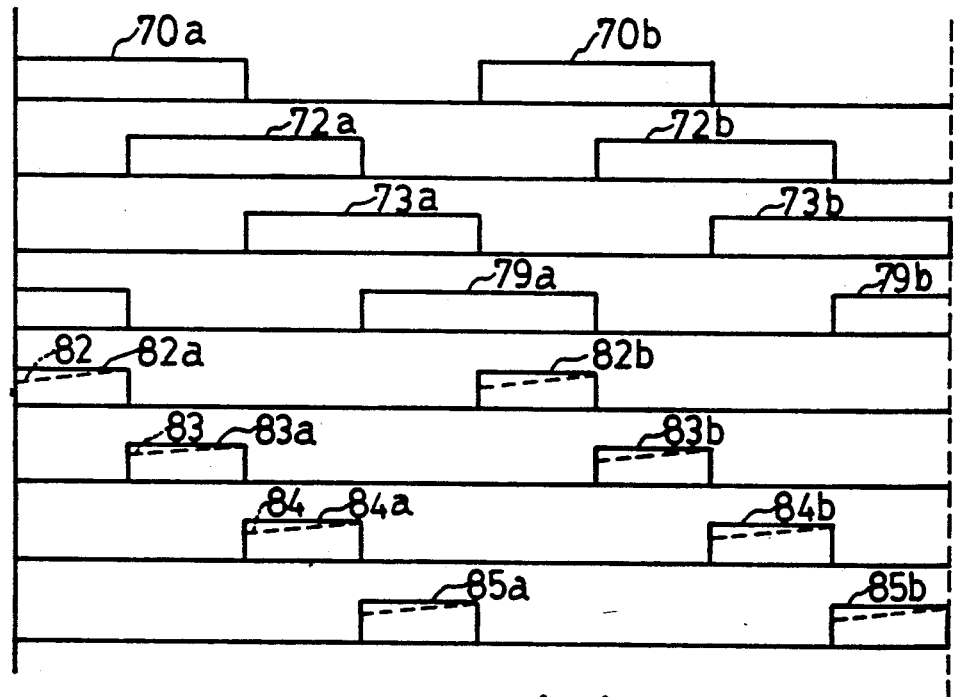

The input of the block circuit 9 forms the line 25a, 25b, . . . of the time chart shown in FIG. 9 (a), and the input that goes through the inversion circuit 13d forms the line 26a, 26b, . . .

The block circuit 7d, 7e shown in FIG. 4 is the same as the foregoing bridge circuit which includes the coil 10b, 10c.

The oscillator 7 can be used commonly.

The output of the block circuit 7d and the output of the inversed rotation circuit 13e are inputted into the block circuit 9, and the output signals of such block circuits are shown as the line 27a, 27b, . . . and the line 28a, 28b, . . . in FIG. 9 (a).

The output of the block circuit 7e and the output of the inversion circuit 13f are inputted into the block circuit 9, and their output signals are shown as the line 29a, 29b, . . . and the line 30a, 30b, . . . in FIG. 9 (a).

With respect to the line 25a, 25b, . . . , the line 27a, 27b, . . . is delayed 120 degrees by the phase thereof, while the line 29a, 29b, . . . is delayed 120 degrees by the phase thereof with respect to the line 27a, 27b, . . . .

The block circuit 9 is a circuit generally used in the control circuit of a 3 phase, Y type semiconductor electric motor and is a logic circuit from which 120 degree wide, rectangular wave electric signals can be obtained through the terminal 9a, 9b, . . . , 9f by the input of the foregoing position detection signal.

In FIG. 9 (a), the output of the terminal 9a, 9b, 9c is shown as the line 31a, 31b, . . . , the line 32a, 32b, . . . , and the line 33a, 33b, . . .

The output of the terminal 9d, 9e, 9f is shown as the line 34a, 34b, . . . the line 35a, 35b, . . . and the line 36a, 36b, . . .

The phase difference of the output signals of the terminals 9a and 9d, the output signals of the terminals 9b and 9e, and the output signals of the terminals 9c and 9f is 180 degrees.

The output signals of the terminal 9a, 9b, 9c delay in order by 120 degrees without overlapping and the output signals of the terminal 9d, 9e, 9f also delay in order by 120 degrees without overlapping.

The similar effect can be obtained by using an aluminium plate which has the same shape as the rotor 1 and rotates synchronously with such rotor shown in FIG. 2 (a), instead of using the salient pole 1a, 1b, . . . of the coil 10a, 10b, 10c.

The reluctance type electric motor has the following defects.

In the first place, as shown by the line 42 of the time chart of FIG. 9 (a), when the salient pole starts to oppose the magnetic pole which is the initial period, the torque is considerably large and becomes small in the final period.

Therefore, the defects include a ripple torque wherein the combined torque is also large.

To prevent such defects, it is effective if the following means is used.

That is, a means is provided to cause the cirectional width of the rotating shaft of the salient pole to be different from that of the magnetic pole. With this means, the output torque curve is made flat by the leaking magnetic flux as shown by the curve 42a.

The defects stated above may become effective technical means under certain circumstances. Details of such case will be described later with reference to FIG. 6 (b).

The second defect is the deterioration of efficiency.

In FIG. 9 (a), the excitation current curve is as shown by the curve 46 during energizing with 180 degrees width.

During the initial energizing, the current value is small due to the inductance of the excitation coil and becomes further small in the central part thereof due to reverse electric power.

During the final energizing, the peak value is equal to the current value during starting. Because no output torque exists in this section, only Joule loss is involved, which reduces the efficiency considerably.

Because the curve 46 is 180 degrees wide, the magnetic energy is discharged as shown by the dotted line which is turned into counter torque, resulting in increased deterioration of efficiency.

The third defect is that when the output torque is made large, that is, when the salient pole and the number of the magnetic pole are increased and the excitation current is increased, the speed of rotation is made considerably small.

Generally, the reluctance type electric motor requires increase in the number of the magnetic pole and salient pole of FIG. 1 (a) so as to increase the output torque, and it is also necessary to reduce the opposing gap of the two.

If an attempt is made to maintain the speed of rotation at the specified value when the above conditions are needed, the start-up ramp of the excitation current becomes gentle relatively due to the magnetic energy accumualted in the magnetic pole 16a, 16b, . . . and the salient pole 1a, 1b, . . . shown in FIG. 1 (a) or if the energization is shut off, the time the discharge current is annihilated by the magnetic energy is extended relatively even if the energization is shut off. Therefore, a large counter torque is generated.

According to such conditions, the peak value of the excitation current is reduced and the counter torque generated, the small speed of rotation results.

The foregoing defects occur because the magnetic energy accumulated in the excitation coil is considerably largy as compared with that of common brushless electric motor, and longer time for accumulation and discharging thereof will result.

Therefore, the speed of rotation becomes small and the efficiency deteriorated. Also, the responsiveness is caused to deteriorate when a motor is used as a servo motor.

In the developments of FIG. 1 (a) and FIG. 2 (a), the annular portion 16 and the magnetic pole 16a, 16b, . . . are composed of a well-known means for laminating and solidifying the silicon steel plate and made into an armature which is secured to the outer housing not shown in the diagram.

The annular portion 16 composed a magnetic core which becomes the magnetic path and the annular portion 16 and the magnetic pole 16a, 16b, . . . constitute an armature.

Seven salient poles are provided at an equal width and equal distance.

The width of the magnetic pole 16a, 16b, . . . is equal to that of the salient pole. Six magnetic poles are arranged at equal pitches.

When the excitation coil 17b, 17c is energized, the salient pole 1b, 1c is attracted and rotates in the direction of the arrow A. When the salient pole is rotated, the energization of the excitation coil 17b is discontinued and the excitation coil 17b is energized, torque is generated by the salient pole 1d.

At every rotation of 60 degrees of the rotor 1, the energization mode of the excitation coil is changed, and the excitation polarity of the magnetic pole is changed periodically from the magnetic pole 16b (N pole), magnetic pole 16c (S pole)→magnetic pole 16c (S pole), from magnetic pole 16d (N pole)→magnetic pole 16d (N pole), from magnetic pole 16e (S pole)→magnetic pole 16e (S pole), from magnetic pole 16f (N pole)→ magnetic pole 16f (N pole), and from magnetic pole 16a (S pole)→, so that the 3 phase reluctance type electric motor is available wherein the rotor 1 thereof is driven into the direction of arrow A.

Because the two magnetic poles excited are always different, the leaking magnetic flux passing through the non-excited magnetic pole is in reverse direction respectively, thereby the counter torque generation is prevented.

In order to reduce further the foregoing leaking magnetic flux, one set of magnetic poles using the two magnetic pole 16a of the first phase is made, and each such pole is energized by the excitation coil to be excited into an N magnetic pole and an S magnetic pole.

Then, the leaking magnetic flux caused by each two magnetic poles is negated and annihilated at the other magnetic pole, thereby eliminating the leaming magnetic flux.

Other magnetic pole 16b, 16c, . . . , 16f are composed as two sets respectively, making one set of the two magnetic poles which are to be excited by an N magnetic pole and an S magnetic pole. The effect of the latter is the same, and the leaking magnetic flux is annihilated. In such as case, the number of the salient pole 1a, 1b, . . . becomes eleven.

An energizing means of the excitation coil 17a, 17b, . . . will now be described.

Figure 6:
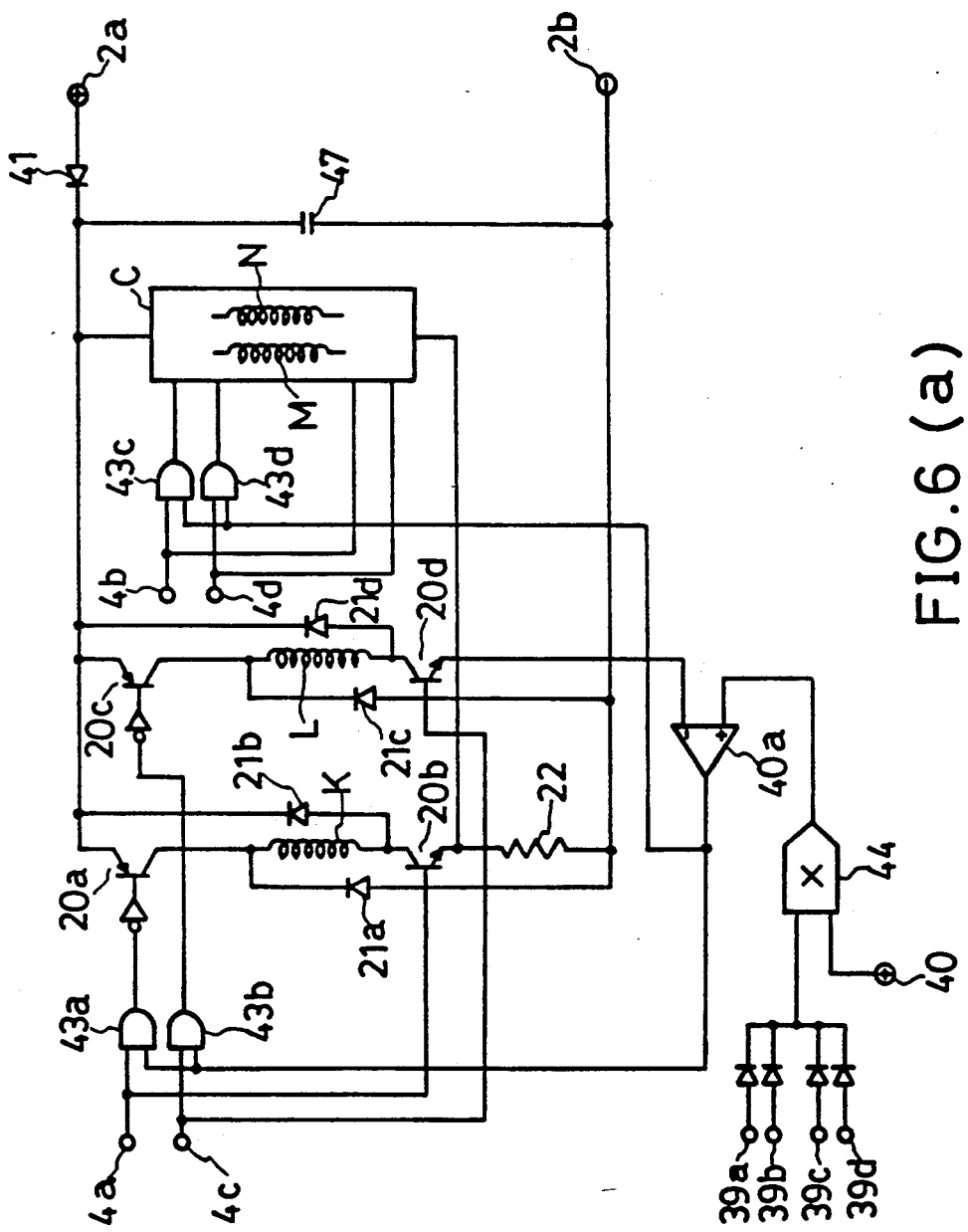

In FIG. 6 (d), the excitation coil 17a, 17b, 17c is inserted at the both ends thereof with the transistor 20a, 20b and 20c, 20d and 20e, 20f respectively. The transistor 20a, 20b, . . . constitutes a switching element, and other semiconducting element having the same effect may be used.

Power is supplied from the positive/negative terminal 2a, 2b for DC power source.

When an input under the AND circuit 43a is high level and a high level electric signal is inputted from the terminal 4a, the transistor 20a, 20b becomes conductive and the excitation coil 17a is energized. When a high level electric signal is inputted from the terminal 4b, 4c, the transistor 20c, 20d and 20e, 20f become conductive likewise and the excitation coil 17c, 17e is energized. The block circuit D, E, F is the energization control circuit of the excitation coil 17b, 17d, 17f and has the same composition as the energization control circuit of the excitation coil 17a.

Therefore, when the input under the AND circuit 43b, 43e, 43f is high level and the terminal 4d, 4e, 4f has a high level input, respective excitation coil 17b, 17d, 17f is energized.

The terminal 4a, 4b, 4c is inputted respectively with the rectangular wave line 31a, 31b, . . . , 32a, 32b, . . . , 33a, 33b, . . . shown in FIG. 9 (a) which become the position detection signal.

The terminal 4d, 4e, 4f is inputted respectively with the rectangular wave line 36a, 36b, . . . , 34a, 34b, . . . , 35a, 35b, . . . shown in FIG. 9 (a).

Now, the electric signal which is inputted from the terminal 39a, 39b, . . . , 39f will be described.

Figure 7:
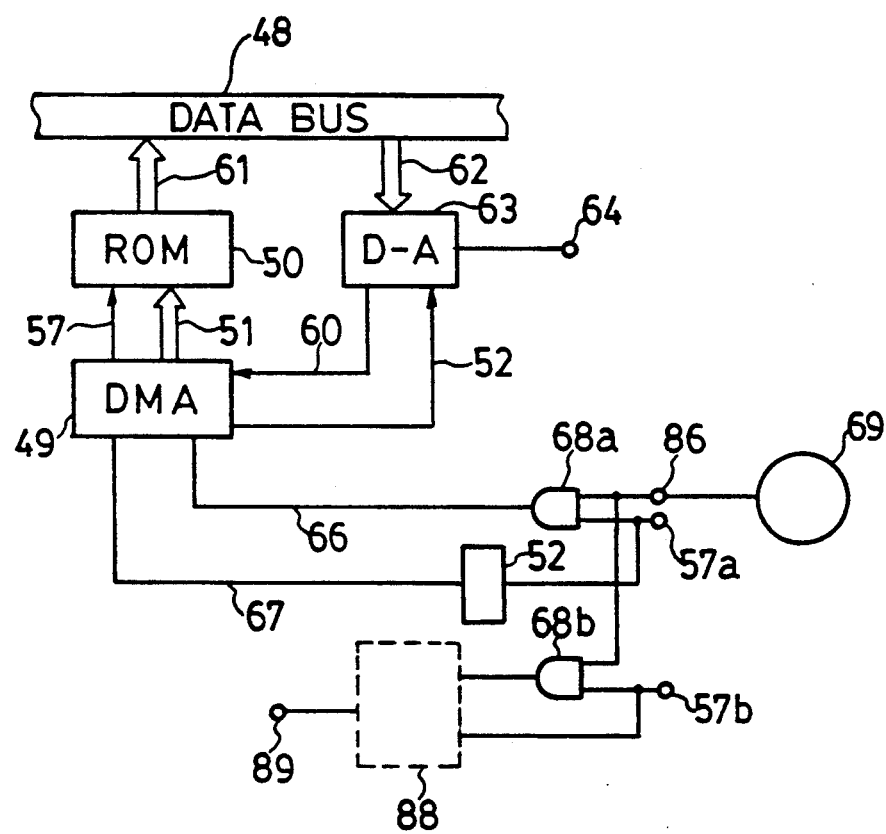
FIG. 7 is an electric circuit diagram.

If FIG. 7, the rectangular wave curve 31a, 31b, . . . shown in FIG. 9 (a) is inputted from the terminal 57a.

Electric signal of the shaft encoder 69 is inputted from a rectangular wave form shaping circuit not shown in the diagram into the terminal 86 as a rectangular wave electric pulse train.

The terminal 57a is inputted with the position detection signal 31a, 31b, . . . shown in FIG. 9 (a).

The output of the AND circuit 68a becomes an electric signal which has an input electric pulse of the terminal 86 equal to the width of the position detection signal 31a, 31b, . . .

In the differentiation circuit 52, the differentiation pulse is obtained at the start-up point of the position detection signal 31a, 31b, . . . , and the obtained pulse is inputted into the direct memory access controller circuit 49 (hereafter described as the DMA controller circuit 49) as the resetting signal by means of the reset 67.

Figure 8:
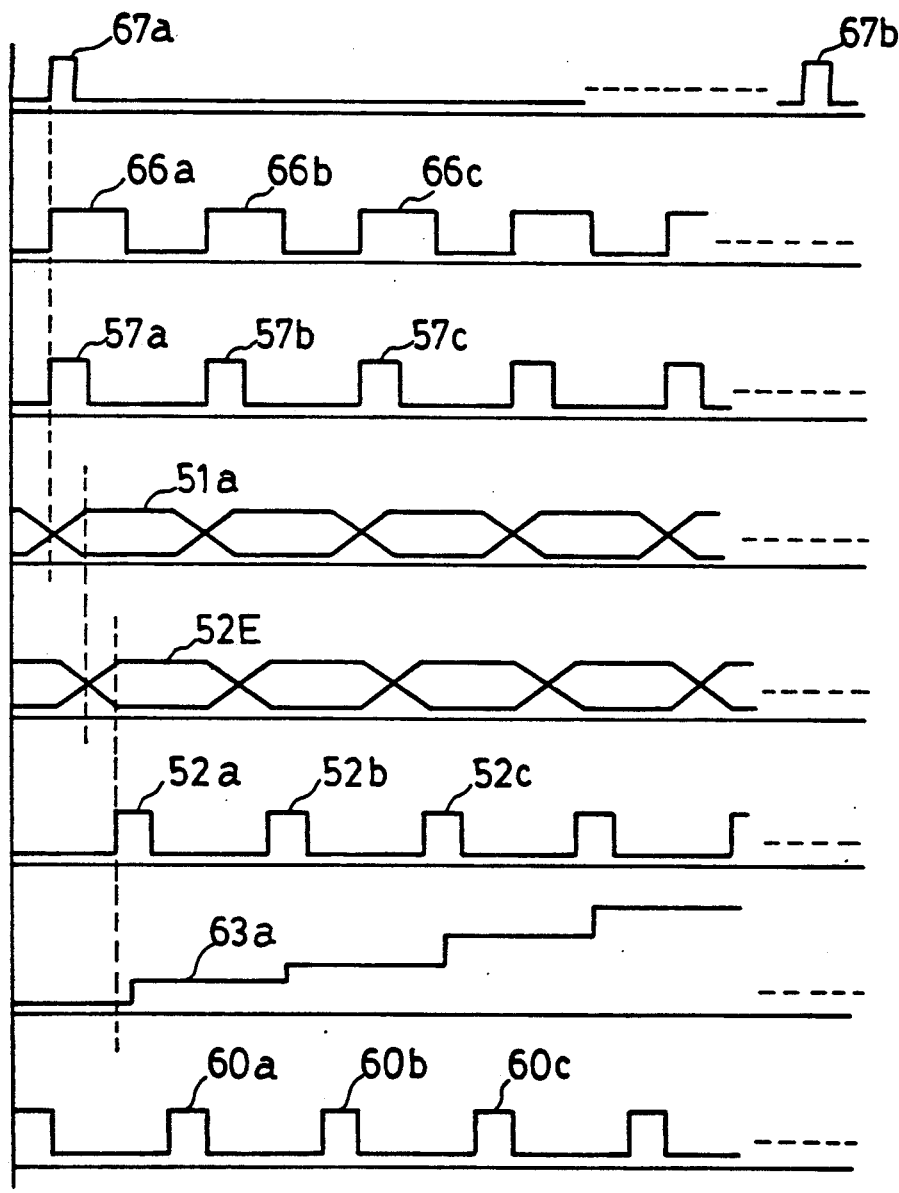
FIG. 8 is a time chart of the electric circuit shown in FIG. 7, and FIGS. 9 (a), (b), (c) is a time chart of the position detection signals, excitation current and output torque of the energizing control circuit of each of the embodiments of the present invention.

The resetting signal 67a, 67b, . . . is indicated in the time chart shown in FIG. 8.

The output of the AND circuit 68a is also inputted into the DMA controller circuit 49 as an electric signal 66a, 66b, . . . shown in FIG. 8 by means of the lead 66.

From the DMA controller circuit 49, a date read signal is inputted in the ROM 50 by means of the lead 57 and an address advance signal is inputted into the ROM 50 by means of the address bus 51. The height of the inclined wave 31 shown in FIG. 9 (a) is digitalized and stored into the ROM 50.

This inclined wave 31 has the same amplitude as that of the rectangular wave 31a and is an electric signal whose height increases with the lapse of time. The inclination being increased is linear in the embodiment of the present invention, but it may not necessarily be a linear inclination. However, the difference between the height of the initial section and the height of the final section should be the specified value.

Details of this height difference will be described at a later part of this specification.

Because the electric pulse of the shaft encoder 69 is used for the address of the ROM 50 memory, the relative angle of the salient pole and the magnetic pole forms a horizontal axis, that is, becomes an address, and the height of the curve the inclined wave 31 at the position of the angular phase of such address is stored into the ROM 50 as the digital signal.

The width of the curve of this inclined wave 31 is 120 degrees, and generally, the address of the memory may be an address split into 100 parts and is provided so that the address is changed every 1.2 degrees.

From the DMA controller circuit 49, the read signal is inputted into the digital/analog conversion sircuit 63 (hereafter referred to as D-A conversion circuit 63) by means of the lead 52, and the ready signal from the D-A conversion circuit 63 is inputted into the DMA controller circuit by means of the lead 60.

From the ROM 50, the data output is outputted on the data bus by means of the data output lead 61 and inputted into the D-A conversion circuit 63 by means of the data input lead 62.

Operations of the reader of the foregoing composition will be described together with the time chart shown in FIG. 8.

The output of the differentiation circuit 52 becomes the resetting signal and inputted into the DMA controller circuit 49 as the resetting signal 57a, 57b, . . . shown in FIG. 8 through the lead 67.

In addition, the signal synchronized with the rotational position of the electric motor is outputted from the shaft encoder 69 and the synchronous signal 66a, 66b, . . . is inputted into the DMA controller circuit 49 through the waveform shaping circuit not shown in the diagram and the lead 66.

The start-up point of this synchronous signal 66a is detected as the start signal of the DMA controller circuit 49, the date read signal 57a, 57b, . . . and the address advance signal 51a from the DMA controller circuit 49 is inputted into the ROM 50 respectively by means of the lead 57 and the address bus 51, and the data stored in the ROM 50 is outputted as the date signal 53E onto the data bus 48 sequentially through the data output lead 61.

When the data output onto the data bus 48 is completed, the read signal 52a, 52b, . . . from the DMA controller circuit 49 is inputted into the D-A conversion circuit 63 through the lead 62, stored into the D-A conversion circuit 63 through the data input lead 62 on the data bus 48, and the digitalized numeric values stored into a first address of the ROM 50 is converted into analog signal.

An example of such analog signal is shown in FIG. 8 as the output signal 63a.

When the conversion from the digital signal to the analog signal is started, the ready signal 60a, 60b, . . . from the D-A conversion circuit 63 is inputted into the DMA controller circuit 49 through the lead 60, and the operation proceeds to an operation where the digitalized numeric value stored in a second address of the ROM 50 is converted into analog signal.

The foregoing operations are repeated, and the output of the terminal 64 of the D-A conversion circuit 63 becomes the output signal 63a for example.

The output of the output terminal 64 of the D-A conversion circuit 63 is turned into the waveform of the signal 63a shown in FIG. 8, and the degital signal is stored in advance into each address of the ROM 50 so that the signal 63a waveform is turned into the inclined wave 31 shown in FIG. 9 (a).

By converting the output of the terminal 64 into the input signal of the terminal 39a shown in FIG. 6 (d), the energizing of the excitation coil 17a is controlled.

Because the input signal that flows through the terminal 57a shown in FIG. 7 is the same as the curve 32a, 32b, . . . shown in FIG. 9 (a), the output of the AND circuit 68b becomes the electric signal which has an electric pulse only between the amplitude of the curve 32a, 32b, . . .

When this electric signal is inputted into the circuit 88 similarly composed as the circuits such as the DMA controller circuit 49, ROM 50 and D-A conversion circuit 63 shown in FIG. 7, the analog signal corresponding to the digital signal read from the terminal 89 is obtained. The output of the terminal 89 becomes the inclinded wave of the curve 32 shown in FIG. 9 (a). This electric signal is inputted from the terminal 39b shown in FIG. 6 (d).

The waveform that corresponds to the rectangular wave 31 is the inclined wave 31. The waveform that corresponds to other curve 32a, 33b, . . . is also the inclined wave 32, 33, . . .

With respect to the rectangular wave 33a, 33b, . . . , 34a, 34b, . . . , 35a, 35b, . . . , 36a, 36b, . . . , it is possible to obtain the inclined wave which corresponds to the circuit similar to the circuit shown in FIG. 7.

The linclined wave 33 is inputted from the terminal 39c of FIG. 6 (d) and the inclined wave 34, 35, 36 is inputted from the terminal 39d, 39e, 39f respectively.

The reference voltage 40 is a voltage which commands output torque.

The input signal of the terminal 39a, 39b, 39c and the reference voltage 40 are multiplied by the multiplication circuit 44a, and the electric signal of the inclined wave corresponding in size to the reference voltage 40 is inputted into the positive terminal of the operational amplifier 40a.

The input signal of the terminal 39d, 39e, 39f is also multiplied by the multiplication circuit 44b, and the electric signal of the inclined wave corresponding in size to the reference voltage is inputted into the positive terminal of the operational amplifier 40b.

Instead of the means to obtain the foregoing inclined wave, other means may be employed.

The resistor 22a, 22b is provided to detect the excitation current respectively of the excitation coil 17a, 17c, 17e and the excitation coil 17b, 17d, 17f.

The detected voltage is inputted into the negative terminal of the operational amplifier 40a, 40b. Defects of the reluctance type electric motor have been stated above, but the reason causing such defects is that the inductance of the excitation coil is extermely large.

Figure 5A:
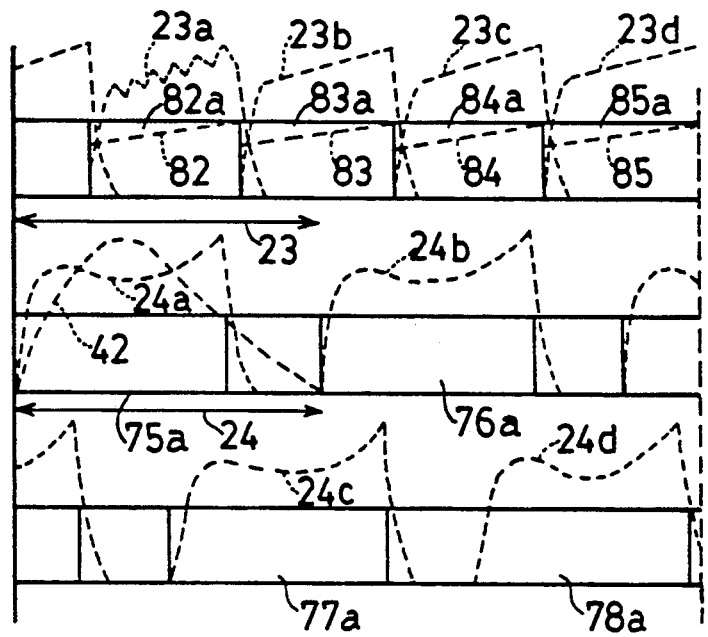

That the inductance is large means an advantage of large output torque available but also means a weak point as well. FIG. 5 (c) describes details thereof.

When the transistor 20a, 20b of FIG. 6 (d) is energized by the rectangular wave signal 31a which becomes the position detection signal of FIG. 9 (a), the energizing angle is 120 degrees, and as shown in the curve 19b of FIG. 5 (c), the excitation current gradually increases in the start-up portion due to the accumulated magnetic energy, while in the falling portion the accumulated magnetic energy is discharged for gradual reduction.

The amplitude of the arrow 19c is 180 degrees, in which section the positive torque is generated by energizing, and the counter torque is generated in the section of the arrow 19d which is outside of the arrow 19c section. In the start-up portion where energizing current increases gradually, the reduced torque is generated.

As the speed of rotation increases, the amplitude of the curve 31a is reduced and the couter torque and reduced torque are increased. Therefore, an increase in the speed of rotation is prevented to make the electric motor run at low speed with the efficiency being deteriorated, and the utility of the electric motor is lost.

As a means to remove such inconveniences, a method is available wherein the diode 41a of FIG. 6 (d) is removed and high voltage is provided for the power terminal 2a, 2b. In such a case, it is necessary to use the chopper circuit to maintain the excitation current at the specified level.

Because high voltage is applied in the starting section of the curve 31a, the excitation current starts up rapidly thereby preventing the reduced torque from generating.

Then, the excitation current is maintained at the specified level in the chopper circuit and the output torque is obtained.

Because the transistor 20a, 20b becomes deenergized at the end of the curve 31a, the accumulated magnetic energy of the excitation coil 17a is returned to the power source through the diode 21a, 21b, and generally charges a large capacity capacitor. Therefore, the magnetic energy is annihilated quickly, causing quick current drop and the amplitude of the falling section of the curve 19b of FIG. 5 (c) is reduced.

Therefore, the generation of counter torque is controlled.

Greater the speed of rotation, larger the necessity to increase the voltage of the terminal 2a, 2b considerably.

As it can be understood from the above description, in order to run the reluctance type electric motor at high speed (several thousands revolutions per minute), the applied voltage requires several hundreds volt.

Especially, the problem is that it is almost impossible to use a battery as a power source.

With the device according to the present invention, even if the supply voltage is lowered by removing the foregoing problems, generation of the reduced torque and counter torque is prevented, while making it possible to obtain an electric motor of high speed of rotation and high efficiency.

Now, FIG. 6 (d) will be explained.

FIG. 5 (b) shows the time chart of the curve 31a, 31b, 32a, 32b of the position detection signal of the rectangular wave inputted into the terminal 4a, 4b, 4c of FIG. 6 (d) and the time chart of the curve 36a, 34a, 35a of the rectangular wave inputted into the terminal 4d, 4e, 4f. The inclined wave inputted into the terminal 39a, 39b, . . . , 39f is indicated by the curve 31, 32, . . . , 36.

When the transistor 20a, 20b is energized by the rectangular wave 31a inputted into the terminal 4a, the energizing current increases, and when the input voltage (voltage proporational to the excitation current causing voltage drop of the resistor 22a) of the negative terminal becomes higher than the input voltage of the positive terminal of the operational amplifier 40a, the output of the operational amplifier 40a turns into low level, causing the output of the AND circuit 43a to be low level as well, thereby making the transistor 20a deenergized.

Therefore, since the exciting current is supplied by the accumulated magnetic energy thereof through the transistor 20b and diode 21a and reduced, the output of the operational amplifier 40a becomes high level when the excitation current is reduced to a level determined by the hysteresis characteristic of the operational amplifier 40a, and the transistor 20a becomes energized again, increasing the exciting current. When the excitation current is increased to a set value, the output of the operational amplifier 40a becomes low level, reducing the exciting current. A chopper circuit increases and decreases the current. The upper limit of the excitation current is proportional to the output of the multiplication circuit 44a, increases with the time, and becomes the curve 37a shown in FIG. 5 (b).

The base current of the transistor 20a, 20b is shut off at the end of the curve 31a to be deenergized, and the accumulated mganetic energy of the excitation coil 17a charges the capacitor 47a through the diode 21a, 21b. This is because the accumulated magnetic energy of the excitation coil 17a does not return to the power source due to the diode 41a provided.

Because the capacitor 47a has small capacity (about 0.2 microfarad is optimal for a 100 watt output), voltage rises quickly thus the current drop due to the magnetic energy discharging also occurs quickly.

Because the position detection signal of the curve 32a is inputted into the terminal 4b at the same time, energizing of the excitation coil 17c by the chopper circuit similar to the foregoing case corresponding to the curve 32 of the inclinded wave inputted into the terminal 39b, is started.

This excitation current is indicated as the curve 37b. The start-up portion of the curve 37b is controlled by the charging voltage and becomes accelerated.

The accumulated magnetic energy of the excitation coil 17a goes quickly into the excitation coil 17c.

While the accumulated magnetic energy goes into the excitation coil 17c, energy loss is caused due to the copper loss and iron loss of both excitation coils. It is the necessary condition to increase the excitation current proportionally to the dotted line 31, so that the start-up of the excitation current of the excitation coil 17c is raised quickly to a required level by compensating the foregoing energy loss.

Therefore, it is not always necessary to linearlly increase the dotted line 31 of the curve of the inclined wave but the difference between the initial period and the final period needs be the set value.

The capacitor 47a is not always necessary.

However, the capacitor 47a is necessary to accumulate the magnetic energy temporarily into it when there exists a time based gap at the boundary section of the curve 31a and the curve 32b.

The transfer (changing) of the foregoing magnetic energy can be understood from the theory stated hereunder.

In FIG. 5 (d), when a capacitor 56 is charged and the electric switch 55 is closed, an electric vibration occurs.

In the coil R, energizing in the direction of arrow 54a, 54b is accomplished. The frequency of the energizing grows correspondingly as the capacity of the capacitor 56 is reduced.

That is, even if the inductance of the coil R is large, it indicates that the incoming and outgoing magnetic energy become quick.

When the capacitor 47a shown in FIG. 6 (d) is removed, the reverse electromotive force corespondinng to the change in the magnetic energy accumulated in the excitation coil 17c becomes to correspond to the charging voltage of the capacitor 47a, thereby the same purposes are accomplished.

The transmission of the magnetic energy also occurs quickly between the excitation coil 17c and 17e at the and of the curve 32a and at the start of the curve 33a shown in FIG. 5 (b). The energizing current of the excitation coil 17e is indicated as the curve 37c.

The control of the exciting current by the position detection signal curve 36a, 34e, 35a (FIG. 5 (b)) of the rectangular wave of the terminal 4d, 4e, 4f shown in FIG. 6 (d) and the input signal curve (dotted line 36, 34, 35 in FIG. 5 (b)) of the inclined wave of the terminal 39d, 39e, 39f is also carried out in the same manner as stated above by the AND circuit 43d, 43e, 43f and the multiplicaiton circuit 44b, operational amplifier 40b, diode 41b, and capacitor 47b, and the action and effect thereof are the same. The energizing current of the excitation coil 17b, 17d, 17f is indicated by the dotted line respectively.

Therefore, in a 3 phase reluctant type electric motor, the rotor 1 is driven and the output torque is controlled by the reference voltage 40.

The section of the arrow 38 shown in FIG. 5 (b) becomes a 180 degrees section where the positive torque is generated, the start-up and falling of the excitation current take place quickly, so that the counter torque and the reduced torque are prevented from occurring, while the effect of action providing high speed and high efficiency is available.

In addition, since the supply voltage can be a voltage capable of obtaining the exciting current which corresponds to the output torque in excess of the reverse electromotive force (corresponds to the speed of rotation), the electric motor can be driven at relatively low voltage.

The energizing angle of the excitation current is 120 degrees and exists at the central portion where the positive torque is generated.

Therefore, it is possible to obtain the torque at the central portion of the torque curve 42a shown in FIG. 9 (a). However, the object of the present invention can be attained even if the position of the coil 10a, 10b, 10c which issues the position detection signal is adjusted and the 120 degree amplitude from the vicinity of the start of the 180 degree section where the positive torque is generated, is energized.

In such a case, it is preferable to use the torque curve 42a shown in FIG. 9 (a) as the torque curve.

As have been stated above, the armature coil 17a, 17c, 17e is energized sequentially and continuously thereby generating the output torque. The above energizing mode is made the energizing mode of the phase A.

The energizing control of the armature coil 17b, 17d, 17f by the position detection signal curve 36a, 36b, . . . , 34a, 34b, . . . , 35a, 35b, . . . is made the energizing mode of the phase B.

In a 3 phase electric motor such as the one provided by the embodiments of the present invention, the energizing mode of a first phase, second phase and third phase are generally used, however, the energizing modes are separated into two parts and the energizing modes of the phase A and phase B will be used.

The armature coil 17a, 17c, 17e and the armature coil 17b, 17d, 17f are represented as the armature coil of the phase A and the phase B respectively.

Now, an embodiment of the 2 phase reluctance type electric motor according to the present invention will be stated.

FIG. 1 (b) is a plan view of the two phase reluctance type electric motor and FIG. 2 (b) denotes a development of the salient pole, magnetic pole and armature coil of the two phase reluctance type electric motor of FIG. 1 (b).

The annular portion 16 and the magnetic pole 16a, 16b, . . . are composed of a well-known means for laminating and solidifying the silicon steel plate and made into an armature which is secured to the outer housing not shown in the diagram. The annular portion 16 composes a magnetic core which becomes the magnetic path. The magnetic pole 16a, 16b is wound round with the excitation coil 17a, 17b. Other excitaion coils are omitted and not shown in the diagram.

The bearing provided on the outer housing is freely rotatably provided with a rotating shaft 5 and the rotor 1 is secured to the rotating shaft 5.

On the outer circumference of the rotor 1 is provided the salient pole 1a, 1b, . . . and opposes to the magnetic pole 16a, 16b, . . . by means of the gap of about 0.1 to 0.2 mm. The rotor 1 is composed as shown in the development of FIG. 2 (b) by the same means at that used tor the armature 16.

In FIG. 2 (b), ten salient poles are provided at an equal amplitude and equal clearance angle.

The amplitude of the magnetic pole 16a, 16b, . . . is equal to the amplitude of the salient pole, and eight magnetic poles are arranged at equal pitch.

When the excitation coil 17b, 17f, 17c, 17g is energized, the salient pole 17b, 1g, 1c, 1h is attracted and rotates in the direction of the arrow A.

When the salient pole is rotated, the excitation coil 17b, 17f is stopped of energizing, while the excitation coil 17d, 17h is energized, thereby generating the torque by the salient pole 1d, 1i.

The arrow 18a indicates the excitation characteristic of rotating 90 degrees from the condition shown in the diagram, and the magnetic pole 16b, 16c becomes an N pole, while the magnetic pole 16f, 16g becomes an S pole. Such magnetization of magnetism is intended to reduce counter torque caused by the leakage of the magnetic flux.

On the next 90 degree rotation, that is, in the area of the arrow 18b, each magnetic pole becomes the N pole and S pole shown in the diagram. The indication of 0 represents the non-energized magnetic pole.

Then, on the next 90 degree rotation, and the subsequent 90 degree rotation, the magnetic pole is magnetized to the magnetism in the area between the arrow 18c, 18d.

According to the excitation stated above, the rotor 1 rotates into the direction of the arrow A to make two phases of the electric motor. The amplitude between each magnetic pole is 1.5 times the amplitude of the salient pole. In addition, since the gap wherein the excitation coil is to be installed has become greater, it is possible to utilize a large power source, thereby reducing the copper loss while while increasing the efficiency.

In FIGS. 6(a), (b), (c), the excitation coil K, L indicates the excitation coil 17a, 17e and the excitation coil 17c, 17g respectively shown in FIG. 2(b), and the two sets of excitationcoil are connected in series or parallel.

On both ends of the excitation coil K, L is inserted the transistor 20a, 20b and the transistor 20c, 20d respectively.

The transistor 20a, 20b, 20c, 20d composes a switching element, but other semiconductor element having similar effect may be used. Power is supplied from the positive/negative terminal 2a, 2b for DC power source.

When the high level electric signal is inputted from the terminal 4a, the transistor 20a, 20b becomes conductive and the excitation coil K is energized. When the high level electric signal is inputted from the terminal 4c, the transistor 20c, 20d is made conductive, energizing the excitation coil L.

A means to obtain the position detection signal will be described below.

Figure 6B:
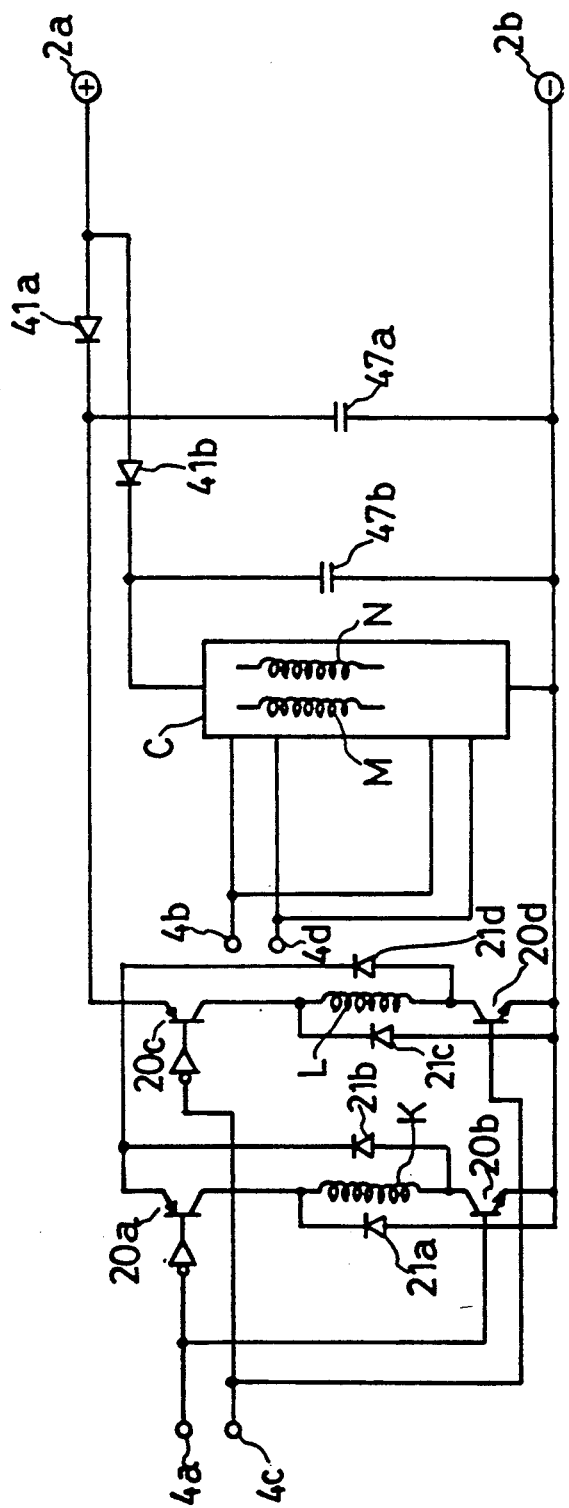

In the case of FIG. 6(a) and FIGS. 6(b), (c), the means for obtaining the position detection signal are different.

In the case of the former, the coil 8a, 8b shown in FIG. 2(b) is utilized, while in the case of the latter, the coil 7a, 7a, 7b, 7b is utilized.

Each coil of the foregoing is composed in the same manner as that of the coil 10a, 10b, 10c. The coil 8a, 8b is fixed on the armature to oppose to the side of the salient pole 1a, 1b . . . .

As shown in FIG. 2(b), the coil 8a, 8b is opposed to the side of the salient pole 1a, 1b, . . . by means of the gap, tereby opposing to the side of the salient pole, the impedance of the coil becomes reduced due to the iron loss (which includes the eddy current loss which is greater). The coil 8a, 8b is separated 90 degrees, has a 5 mm diameter, and an air-core of about 100 turns.

Figure 3:
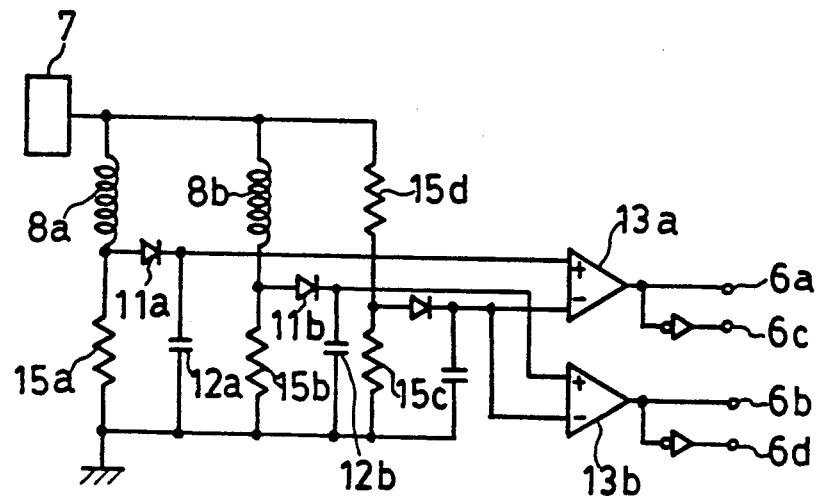

FIG. 3 shows a device for obtaining the position detecting signal from the coil 8a, 8b. The coil 8a, 8b, and transistor 15a, 15b, 15c, 15d constitute a bridge circuit. The output frequency of the oscillation circuit 7 is about 1 to 5 megacycle.

The coil 8a, 8b is fixed to the stationary armature, and when the coil 8a, 8b is opposed to the salient pole 1a, 1b, . . . shown in FIG. 2(b), the impedance thereof is reduced due to the eddy current loss, causing a large voltage drop of the resistor 15a. When the coil 8a is opposed to the salient pole, electric signals smoothed by the low pass filter comprising the diode 11a and capacitor 12a are inputted into the positive terminal of the operational amplifier 13a.

With respect to the votlage drop of the resistor 15b, electric signals smoothed by the low pass filter comprising the diode 11b and capacitor 12b are inputted into the positive terminal of the operational amplifier 13b.

The bridge circuit is adjusted to balance when the coil 8a, 8b does not oppose to the salient pole, and there will be no output of the operational amplifier 13a, 13b under such conditions.

When the coil 8a is opposed to the salient pole, the output of the operational amplifier 13a turns into the output of the rectangular wave of 180 degree amplitude, and this signal is indicated as the curve 70a, 70b, . . . in the time chart shown in FIG. 9(c). The voltage drop of the resistor 15c is rectified and inputted into the negative terminal of the operational amplifier 13a, 13b.

The output of the terminal 6a forms the curve 70a, 70b, . . . while the output of the terminal 6b forms the curve 72a, 72b, . . . , and the amplitude of each curve is 180 degrees.

The output of the terminal 6c, 6d which goes through the reversion circuit becomes the surve 73a, 73b, . . . 79a, 79b.

When the portion where the signals of the curve 70a, 70b, . . . and the curve 79a, 79b, . . . agree shown in FIG. 9(c) is obtained by the AND circuit, the curve 82a, 82b, . . . is formed.

With respect to the curve 70a, 70b, . . . and the curve 72a, 72b, . . . , the curve 83a, 83b, . . . can be obtained by the same means. Using the same means, the curve 84a, 84b, . . . can be obtained from the curve 72a, 72b, . . . and the curve 73a, 73b, and the curve 85a, 85b, . . . can be obtained from the curve 73a, 73b, . . . and the curve 79a, 79b, . . . .

The foregoing position detection signal can be obtained from the aluminum rotor which rotates synchronously with the rotor 1, and the rotor 3 which is the aluminum rotor is indicated in FIG. 2(b). The salient portion 3a, 3b, . . . is provided on the rotor 3 at an equal 120 degee pitch. With the salient portion 3a, 3b, . . . , the coil 7a, 7a, 7b, 7b is opposed, and the impedance is reduced due to the eddy current loss.

The clearance angle of the coil 7a, 7a and the coil 7b, 7b is 180 degrees. The amplitude of the salient pole 3a, 3b, . . . is smaller than 150 degrees and greater than about 90 degrees.

When the coil 8a, 8b shown in FIG. 3 is substituted with the coil 7a, 7a, the output of the terminal 6a forms the curve 75a, 75b, . . . of the time chart shown in FIG. 9(b), while the output of the terminal 6b forms the curve 76a, 76b, . . .

After substituting the coil 8, 8b with the coil 7b, 7b, the output of the terminal 6a forms the curve 77a, 77b, . . . and the output of the terminal 6b forms the curve 78a, 78b, . . . .

The amplitude of each curve is 120 degrees, the phase difference of the curve of the first stage and second stage and that of the third stage and fourth stage defines 180 degrees respectively, while the phase difference of the first stage and third stage is 90 degrees.

Figure 6C:
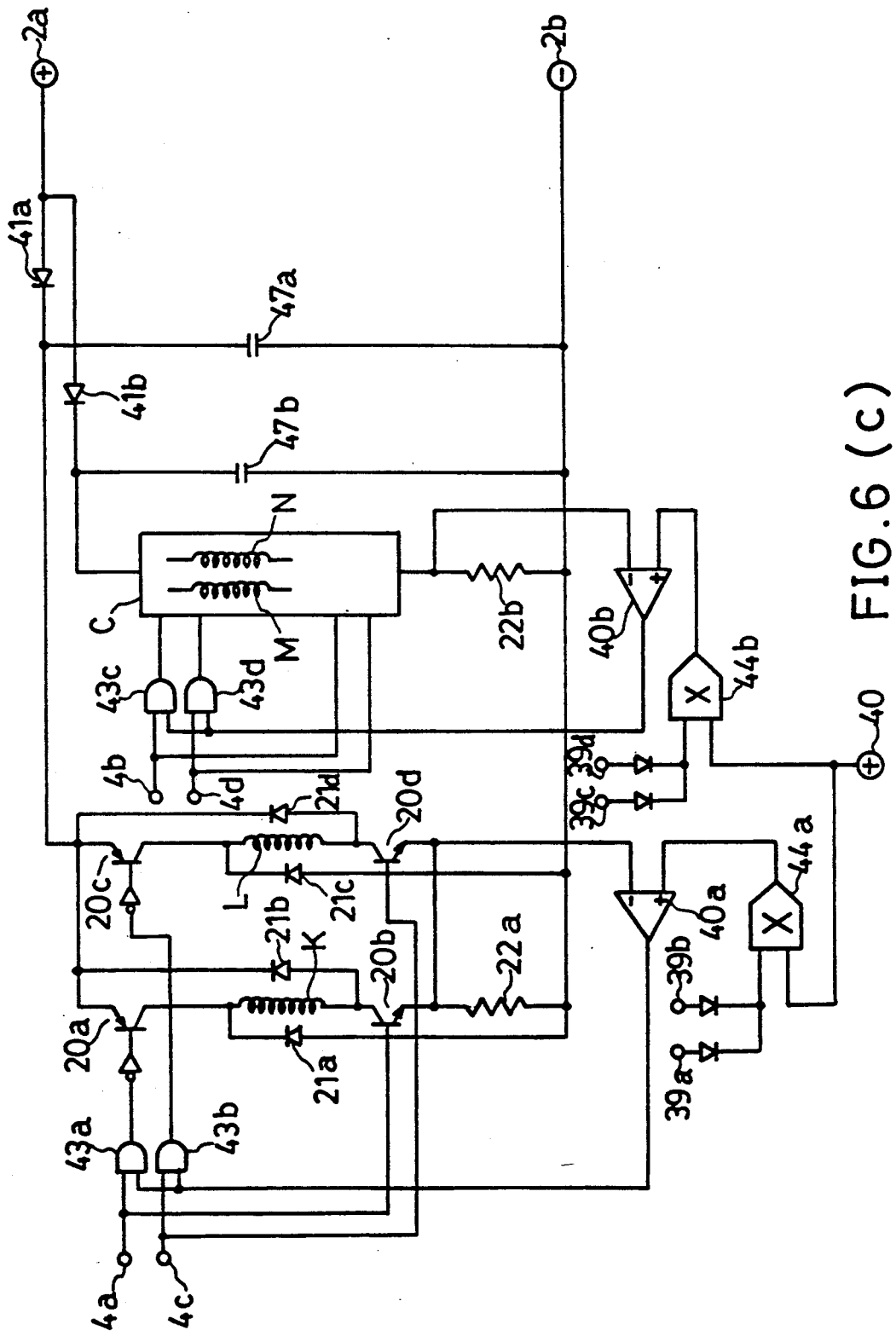

The curve 75a, 75b, . . . and the curve 76a, 76b, . . . that become the position detection signal are inputted into the terminal 4a, 4c shown in FIG. 6(c).

The curve 77a, 7b, . . . and the curve 78a, 7b, . . . are inputted into the terminal 4b, 4d. The voltage dropped of the resistor 22a, 22b turned into the detection voltage which is proportional to the current of the excitation coil K, L and the excitation coil M, N.

The block circuit c is trovided for controlling the energizing of the excitation coil M (17b, 17f) and the excitation coil N (17d, 17h), and is of the same composition as that of the excitation coil M, N.

Signals of the curve 75a, 75b, . . . from the terminal 4a, 4c are inputted, while the signals of the curve 77a and the curve 78a are respectively inputted from the terminal 4b, 4d.

With respect to the electric signals of the curve 75a, 75b, . . . of FIG. 9(b), the logical processing is carried out by the electric circuit shown in FIG. 7 in the same manner as that of the foregoing embodiment, and the prosessed electric signals are converted into the electric signals of the inclined wave with similar amplitude. That is, the electric signal becomes the inclined wave indicated by the dotted line 75.

Other curve 76a, 76b, . . . the curve 77a, 77b, . . . , and the curve 78a, 78b, . . . are also converted into inclined wave by the same means.

These inclined waves are indicated by the dotted line 76, 77, 78.

The terminal 39a, 39b of FIG. 6(c) is inputted with the inclined wave 75, . . . and the inclined wave 76, . . . , while the terminal 39c, 39d, is inputted with the inclined wave 77, . . . and the inclined wave 78, . . . .

Figure 6D:
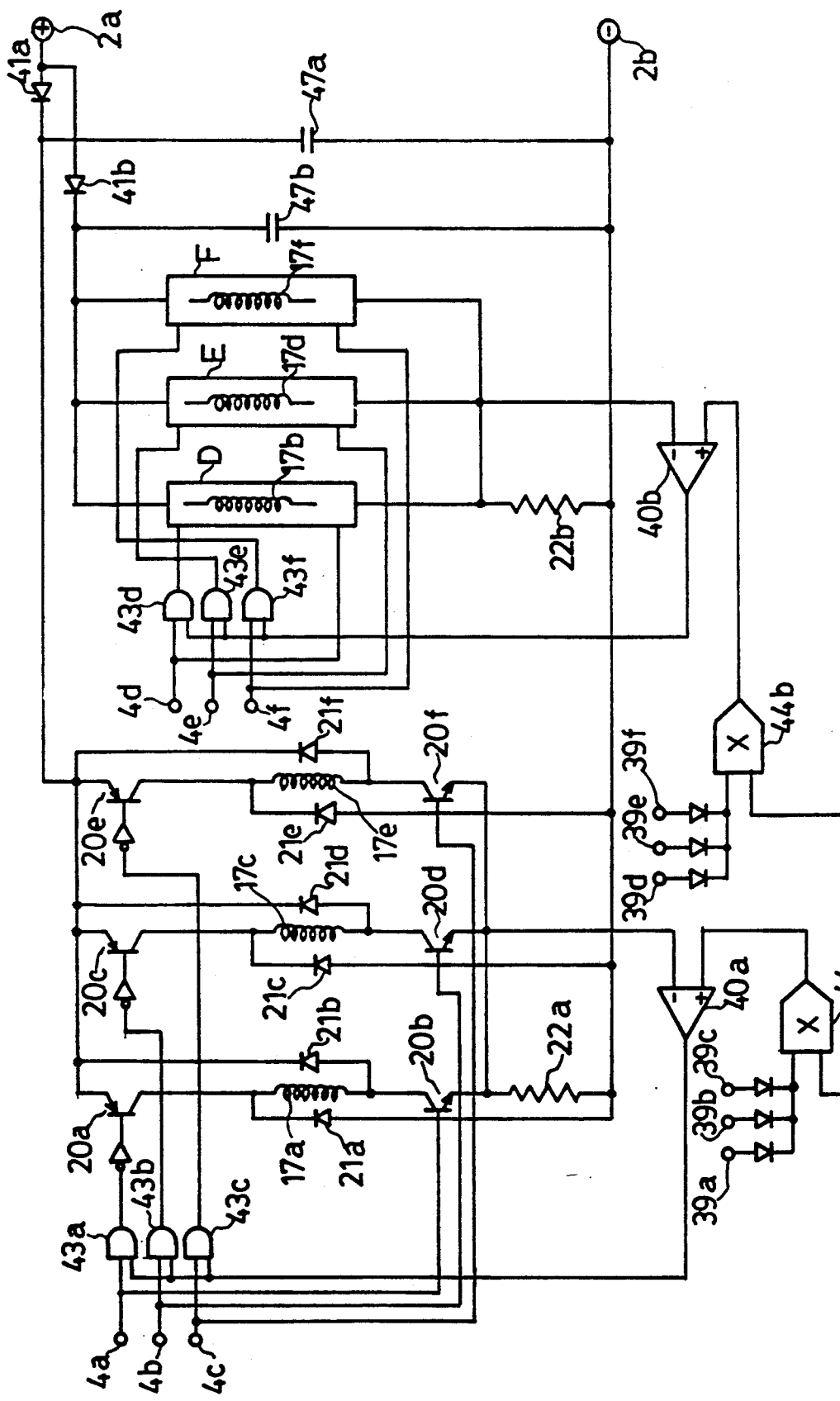

The circuit which controls energizing of one phase excitation coil K, L of FIG. 6(c) has quite the same composition as the circuit having the same symbol shown in FIG. 6(d) used for controlling the energizing of the excitation coil, and the circuit has the same effect.

Figure 5B:
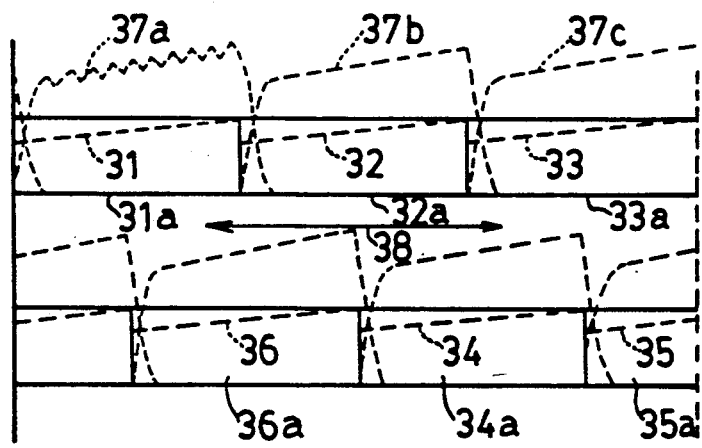
Figure 5:
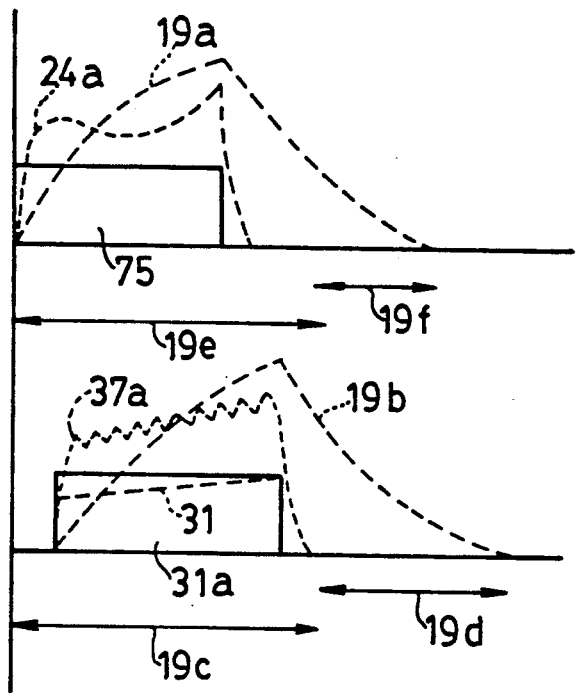
Figure 5:
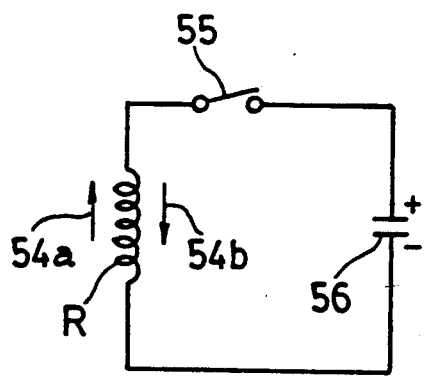

For example, the positaion detection signal (input signal of the terminal 4a, 4c) of the rectangular wave and the energizing waveform due to the electric signal 75, 76 of the inclined wave are similar to those of the curve 37a, 37b, . . . shown in FIG. 5(b), and the chopper is controlled to increase the current gradually.

The energizing waveform 80a, 80b, . . . shown in FIG. 9(b) is formed and its effect is the same.

When viewed from the power source, the foregoing energizing turns into the energizing of one mode, which is referred to as the energizing of the excitation coil of the phase A.

With respect to the excitation coil M, N of other phase, the position detection signal curve 77 and the curve 78a of FIG. 9(b) are inputted into the terminal 4b, 4d and the inclined wave 77, 78 are inputted into the terminal 39c, 39d of FIG. 6(c). Because the circuit that controls the energizing of the excitation coil M, N by these electric signals is similarly composed to the energizing control circuit of the excitation coil K, L, such circuit is indicated as a block circuit having the same effect.

Because the excitation coil M, N produces energizing of one mode, such energizing is referred to as the energizing mode of the phase B.

The energizing waveform of the excitation coil M, N is formed by the position detection signal 77a, 78a and has similar composition and effect to those of the dotted line 80a, 80b, . . . shown in FIG. 9(b).

Unlike from the foregoing embodiment, the capacitor 47a, 47b of FIG. 6(c) is a necessary part.

When the excitation coil K is deenergized and the accumulated magnetic energy is disahrged as shown at the lower section of the curve 80a of FIG. 9(b), the capacitor 47a is charged, the charging current is quickly annihilated, and the charging voltage thereof quickly accelerates the start-up of energizing of the excitation coil L.

Therefore, the falling section of the curve 80a moves quickly and the start-up of the curve 80b also becomes quick, thereby preventing the counter torque and reduced torque from generating.

Therefore, the voltage of the power source terminal 2a, 2b has nothing to do with the transition of the magnetic energy of the excitation coil. Such voltage may be a value which is greater by a set value (the value corresponding to the output torque) from the reverse electromotive force relative to the speed of rotation and thus is capable of driving an electric motor at relatively low voltage level of a power source.

The excitation coil starts being energized from the vicinity of a point where the salient pole begins entering the magnetic pole and the energizing is discontinued upon turning 120 degrees, so that the counter torque will not occur unless the amplitude of the falling section exceeds 60 degrees due to the discharging of the magnetic energy. Thus an electric motor that runs at high speed can be obtained.

As is apparent from the foregoing description, the embomentof the present invention has the same effect of actions as that of the previous embodiment thereof.

A two phase electric motor of the embodiment according to the present invention will be described as shown in FIG. 6(a).

The energizing control circuit of the excitation coil K, L and the energizing control circuit of the excitaion circuit M, N are similarly composed to those circuits shown in FIG. 6(c).

What is different is the position detection signal to be inputted from the terminal 4a, 4b, 4d, 4e.

The position detection signal curve 82a, 82b, . . . , the curve 83a, 83b, . . . , the curve 84a, 84b, . . . , and the curve 84a, 84b, . . . of FIG. 9(c) are inputted respectively from the terminal 4a, 4b, 4c, 4d.

Therefore, the excitation coil is energized every 90 degrees and the energizing order is from the armature coil K→M→L→N.

It is a generally adopted means to select a position of the position detection coil so that such position corresponds with a point where the maximum torque is obtained by respective magnetic poles with respect to the central section of each of the curve 82a, 83a, 84a, 85a. However, the position of the coil 8a, 8b of FIG. 2(b) may be adjusted and fixed so that the energizing of the armature coil is started from the vicinity of a point where the salient pole starts entry into the magnetic pole so as to shut off the energizing upon turning 90 degress.

Therefore, unless the amplitude of the falling section of the current exceeds 90 degress due to discharging of the magnetic energy accumulated in the excitation coil, there will be no generation of the counter torque.

Therefore, in accordance with the embodiment shown in FIG. 6(c), it is possible further to obtain an electric motor which runs at high speed and high efficiency.

The position detection signal curve 82a, 83a, 84a, 85a is indicated with the same symbol, in the time chart of FIG. 5(a).

In FIG. 6(a), when the power is supplied and the position detection signal of the curve 82a is inputted from the terminal 4a, the excitation coil M is started being energized after the transistor 20a, 20b has become conductive, and the curve subsequently formed is indicated as the dotted line 23a in FIG. 5(a).

Therefore, when the voltage drop occurs in the resistor 22 and such voltage drop exceeds the output voltage of the multiplication circuit 44 which is controlled by the reference voltage 40 used as an input of the positive terminal of the operational amplifier 40a, the output of the operational amplifier 40a becomes low level. The output of the AND circuit 43a also changes into low level, causing the transistor 20a to become non-conductive.

Since the transistor 20b is conductive, the magnetic energy accumulated in the excitation coil K is discharged through the diode 21a and resistor 22.

When the voltage drop of the resistor 22 is reduced and exceeds a specified value, the output of the operational amplifier 40a returns to the high level due to the hysteresis of the operational amplifier 40a.

Therefore, the transistor 20a becomes conductive again, the armature current is increased, and when the armature current exceeds a current controlled by the reference voltage 40, the transistor 20a becomes non-conductive again.

A chopper circuit is composed to repeat such cycles.

The curve 82a, 82b, ... and the three system position detection signal under such curve shown in FIG. 9(c) is processed with the same logic as the foregoing previous embodiment by an electric circuit shown in FIG. 7 and the processed signal is changed into the output signal of the inclined wave of 82, ..., 83, ..., 84, ..., 85, ... whose voltage increases with the lapse of time. Electric signal of such inclined wave 82, 83, 84, 85 is also shown in FIG. 5(a).

These electric signals are inputted into the terminal 39a, 39b, 39d respectively shown in FIG. 6(a) and the output voltage of the multiplication circuit 44 is controlled by the reference voltage 40 so that the height of the output voltage is changed.

Therefore, the energizing curve 23a of the excitation coil K increases gradually as shown in FIG. 5(a) and becomes non-conductive together with the transistor 20a, 20b at the end of the position detection signal 82a, so that the accumulated magnetic energy of the excitation coil K charges the capacitor 47 by means of the diode 21a, 21b.

Subsequebt to the charging voltage, because the applied voltage of the excitation coil M to be energized next rises, the energizing current rises quickly.

At this time, voltage is applied to the excitation coil M from the position detection signal curve 83a of FIG. 5(a) which is to be inutted the terminal 4b.

It is preferable to use a capacitor 47 of small capacity. With a small capacity capacitor, the charging voltage rises quickly, causing quick start-up of energizing the excitation coil M, thereby the amplitude of the falling section of the current of the excitation coil K can also be reduced.

If there is no time based clearance in the boundary of the curve 82a and 83a of FIG. 5(a) and if the timing of making the transistor 20a, 20b non-conductive and the timing of making the transistor 20c, 20d can be conincided, then, the capacitor 47 can be removed.

The height of the falling section during the final period is set higher thant the height of the start-up section during the initial period of the energizing curve 23a shown in FIG. 5(a). In the same manner as the previous embodiment, the height difference is set to compensate the energy loss caused by the copper loss and iron loss during transition of the two excitation coils provided on both sides of the boudary, thereby quickly moving the start-up of the energizing curve to obtain a specified height.

Therefore, even if the voltage of the power source terminal 2a, 2b is low, an electric motor of high speed and high efficiency can be obtained.

The amplitude of the arrow 23 is 180 degrees in the section where the positive torque is generated.

When the falling section of the curve 23a exceeds this amplitude, counter torque is generated, so that the amplitude of the falling section is reduced, as stated above, to obtain an electric motor as high speed and high efficiency.

By converting the accumulated magnetic energy of the excitation coil K into the magnetic energy of the excitation coil M, the start-up section and the falling section of the curve 23a, 23b, ... can be accelerated quickly.

The diode 41 prevents the condition wherein the action stated above is not carried out when the accumulated magnetic energy is inputted into the power source.

The excitation coil M is energized by the opertional amplifier 40a and the AND circuit 43c in the same manner as the case of the excitation coil K. The chopper action takes place which produces a current value controlled by the reference voltage 40.

The current caused by the chopper action is shown but the pulsating current thereof is omitted and not shown.

When the position detection signal 84a, 85a of FIG. 5(a) is inputted into the terminal 4c, 4d, the energizing current is also controlled in like manner by the AND circuit 43b, 43d and the operational amplifier 40a, the current curve 23c, 23d that includes the start-up section and the falling section thereof is shown, and the similar effect of the action is available.

Though the embodiment of the present invention refers to a two phase electric motor, the mode of energizing may be considered of the phase A only.

Also, the energizing mode can be considered to be an inphase energizing mode. Therefore, the energizing control circuit can be simplified.

In FIGS. 6(a), (d), the diode 41, 41a, 41b is provided on the positive pole 2a of the power source, but the same object can be achieved when such diode is provided in forward direction (the direction in which the excitation current flows) of the negative pole 2b of the power source.

In this case, the diode 41 of FIG. 6(a) is inserted between the pole under the capacitor 47 and the negative pole 2b of the power source.

In the case of FIG. 6(d), each excitation coil is supplies its power directly from the positive pole 2a of the power source, the lower end of the resistor 22a, 22b is separated independently, and the diode 41a, 41b is inserted into forward direction between the separated terminal and the negative pole 2b of the power source.

The pole above the capacitor 47a, 47b is connected to the positive pole 2a of the power source, while the pole under such capacitor is connected to the input side of the diode 41a, 41b.

In the case of FIGS. 6(b), (c) to be described later, the conditions stated above are the same, and the diode 41a, 41b can be provided on the side of the negative pole 2b of the power source.

The same technical concept of the energizing control circuit shown in FIG. 6(b) can be applied to such circuit of the three phase reluctance type electric motor, but the energizing control circuit shown in FIG. 6(c) is an embodiment of the two phase reluctance type electric motor.

Unlike the energizing control circuit of FIG. 6(c), the energizing control circuit of FIG. 6(b) is a circuit which has the same effect without using the electric signal of the inclined wave to be inputted from the terminal 39a, 39b, 39c, 39d.

Therefore, the chopper circuit can also be removed. The curve 75a, 75b, ... and the curve 76a, 76b, ... of FIG. 9(b) which is one phase position detection signal is inputted respectively from the terminal 4a, 4c.

The curve 77a, 77b, ... and the curve 78a, 78b, ... which becomes other one phase position detection signal is inputted respectively from the terminal 4b, 4d.

The position detection signal stated above is also shown in FIG. 5(a). The input signal 75a of the terminal 4a which is one of such position detection signal is indicated in the time chart of FIG. 5(c).

If a general means is used to energize the excitation coil K, the inductance is large and the current during start-up increases gradually due to the accumulated magnetic energy, and even if the energizing is shut off at the end of the curve 75a, the current decreases gradually due to the discharging of the accumulated magnetic energy, thereby forming the curve 19a as shown.

Because the amplitude of the arrow 19e is 180 degrees and forms a section where the positive torque is generated, a reduced torque is generated in the front hahalf section of the curve 19a and a counter torque is generated in the section of the arrow 19f in the rear half section of the curve 19a.

Therefore, it becomes impossible to obtain high speed and the efficiency becomes deteriorated as well. In order to remove these defects, it is necessary to form the energizing waveform into a shape like the curve 24a, to quickly move the start-up section and the falling section so as to provide the height of the falling section higher than the height of the start-up section.

The details of the above conditions will be described.

The curve of the output torque is composed in like manner as the curve indicated by the torque curve 42 explained in FIG. 9(a). This torque curve 42 is shown in FIG. 5(a).

Because the magnetic energy of the excitation coil L is accumulated at high voltage in the small capacity capacitor 47 in the start-up section of the energizing curve 24a, the current rises quickly by such high voltage, and then energized by the voltage of the terminal 2a. The action of the diode 41a is the same as that shown in FIG. 6(c).

Subsequent energizing current is controlled by the difference between the voltage of the terminal 2a and the reverse electromotive force (voltage coresponding to the speed of rotation and the height of the torque curve). Therefore, since the peak current of the torque curve 42 is reduced and the torque is reduced later, the reverse electromotive force is also reduced, while the energizing current rises and takes a form as shown by the curve 24a.

The nergizing is discontinued at the end of the curve 75 and accumulated magnetic energy charges the capacitor 47a to produce high voltage through the diode 21a, 21b.

Because the electric signal of the curve 76a is then inputted into the terminal 4c, the excitation coil is started being energized, high voltage of the capacitor 47a is applied, and the current rises quickly as shown by the curve 24b.

Subsequent energizing forms a curve similar to the curve 24a, and when the energizing is discontinued at the end of the curve 76b, the accumulated magnetic energy charges the capacitor 47a to high voltage, which in turn causes the excitation coil K to rise quickly.

Because the amplitude of the arrow 24 is a section for generating the positive torque, there is no counter torque caused by energizing and the start-up is quick in this section, so that the reduced torque is also prevented, and an electric motor of high speed and high efficiency is obtained.

In addition, since the applied voltage is low, it is effective when a battery is used as power source.

Energizing of the excitation coil M, N by the position detection signal curve 77a, 78a inputted from the terminal 4b, 4d is also controlled in like manner by the diode 41b and the capacitor 47b, its energizing waveform is shown in FIG. 5 (a) as the dotted line 24c, 24d, and the effect of the action obtained is the same as well.

As can be understood from the above decription, the embodiment of the present invention is driven as a two phase electric motor and the output torque is controlled by the applied voltage.

The magnetic energy of the difference between the difference of the height of the start-up section of the dotted line 24a and the height of the falling section thereof shown in FIG. 5 (a) is equivalent to the energy loss caused by the iron loss and copper loss of both excitation coils which changes the magnetic energy.

Therefore, this embodiment has the same effect of action as that of the previous embodiment.

In the circuit shown in FIGS. 6 (a), (c), (d), when the chopper control by the AND circuit 43a, 43b, ... is applied to the transistor 20b, 20d, 20f under the circuit, the same object can be achieved.

The same affect of action can be obtained when one set of two transistors, the transistor 20a, 20b of FIG. 6 (a) for example, is composed simultaneously in a chopper circuit that turns on and off.

When the reference voltage 40 is removed and the operational amplifier (error amplifying circuit) and the rotating speed detection circuit are added, it is possible to obtain a well-known constant speed control circuit to detect a speed of rotation which corresponds to the positive reference voltage.

INDUSTRIAL FIELD OF UTILIZATION

An electric motor according to the present invention is compact and capable of driving it at low voltage, the electric motor can be utilized for motor cars and like which depend on the battery as its power source.

What is claimed is:

1. A reluctance type electric motor comprising:
   a sationary srmature having a two phase magnetic pole on which a two phase excitation coil is wound round;
   a magnetic rotor wherein a plurality of slinet pole opposing to said respective magnetic pole by means of small gap is arranged on the circumference and a rotating shaft is freely rotatably supported on a bearing;
   a position detector comprising a position detecting element which detects the position of the salient pole of said magnetic rotor in order to obtain a first phase position detection signal composed of a first electric signal arranged with an electric signal of an inclined wave whose phase is delayed 360 degrees in order by an electrical angle, with the wave height of said electric signal of the inclined wave being increased with the lapse of time by a specified value at a 90 degree amplitude of an electrical angle, as well as a second electric signal of the same waveform delayed respectively by a 180 degree electrical angle from said first electric signal; and a second phase position detection signal composed of a third and a fourthe electric signals whose phase is delayed respectively by a 90 degree electrical angle from said first and second electric signals having the same waveform as said first and second electric signals;
   a set of two semiconductor switching elements connected to both ends respectively of a first or a fourth excitation coil which composes said two phase excitation coil;
   a DC power source which supplies power by a diode for prevention of reverse current connected in forward direction to said corresponding excitation coil by means of said one set of two semiconductor switching element;
   a group of diode reversely connected to a serial connecting body of the excitation coil corresponding to one of said one set of two semiconductor switching element;
   an energizing control circuit wherein said one set of two semiconductor switching element connected respectively to said first to fourth excitation coil is conducted by only an amplitude of said position detection signal by said first to fourth electric signal and respective said excitation coil is energized thereby obtaining an output torque;
   a means wherein the arranging position of said position detecting element is adjusted and fixed so that power is supplied from said DC power source by only an amplitude of said position detection signal, in a section of 180 degree eletrical angle where the output torque of respective said excitation coil is to be generated;
   an electric circuit in which said first to fourth electric signal and a reference voltage are multiplied to obtain said first to fourth electric signal of an inclined wave having a wave height proporational to said reference voltage;
   An excitation current detecting circuit which detects said first of fourth excitation coil so as to obtain a detecting voltage;
   a chopper circuit wherein when said detecting voltage exceeds the wave height of said first to fourth electric signal, corresponding said semiconductor switching element is made non-conductive, magnetic energy accumulated in said excitation coil is discharged by means of said group of diode, and when said discharging current is reduced by a specified value, said semi-conductor switching element is energized again to hold the excitation current at the set value; and
   a means wherein when said excitation coil is discontinued of energizing at the end of said position detection signal, the magnetic energy accumulated in said excitation coil is changed to be accumulated as the magnetic energy of said excitation coil to be energized next by means of said group of diode and said diode for preventing reverse current, said magnetic energy is quickly discharged and accumulated, thereby preventing a reduced torque and a counter torque from generating.

2. A reluctance type electric motor comprising:
   a stationary armature having a three phase magnetic pole on which a three phase excitation coil is wound round;
   a magnetic rotar wherein a plurality of salient pole opposing to said respective magnetic pole by means of small gap is arranged on the circumference and a rotating shaft is freely rotatably supported on a bearing;
   a position detector comprising a position detecting element which detects the position of the salient pole of said magnetic rotor in order to obtain a first phase position detection signal composed of a first electric signal arranged with an electric signal of an inclined wave whose phase is delayed 360 degrees in order by an electrical angle, with the wave height of said electric signal of the inclined wave being increased with the lapse of time by a specified value at a 120 degree amplitude of an electrical angle, as well as a second electric signal of the same waveform delayed respectively by a 180 degree electrical angle from said first electric signal; and a second phase position detection signal composed of a third and fourth electric signals whose phase is delayed respectively by a 120 degree electrical angle from said first and second electric signals having the same waveform as said first and second electric signals; and a third phase position detection signal composed of a fifth and a sixth electric signals whose phase is delayed respectively by a 120 degree electrical angle from said third and fourth electric singals having the same waveform as said third and fourth electric signals;
   a set of two semiconductor switching element connected to both ends respectively of a first or sixth excitation coil which composes said three phase excitation coil;

a DC power source which supplies power by a first and a second diode for prevention of reverse current connected in forward direction to said first, third and fifth excitation coil and said second, fourth and sixth excitation coil by means of said one set of two semiconductor switching elements which is connected to said first, third and fixth excitation coil and said second, fourth and six excitation coil;

a group of diode reversely connected to a serial connecting body of the excitation coil corresponding to one of said one set of two semiconductor switching elements;

an energizing control circuit wherein said one set of two semiconductor switching element connected respectively to said first or sixth excitation coil is conducted by only an amplitude of said position detection signal by said first or sixth electric signal and respective said excitation coil is energized thereby obtaining an output torque;

a means wherein the arranging position of said position detecting element is adjusted and fixed sa that power is supplied from said DC power source by only an amplitude of said position detection signal, in a section of 180 degree electrical angle where the output torque of respective said excitation coil is to be generated;

an electric circuit in which said first to six the electric signal and a reference voltage are multiplied to obtain said first to sixth electric signal of an inclined wave having a wave height proportional to said reference voltage;

an excitation current detecting circuit which detects said first to sixth excitation coil so as to obtain a detecting voltage;

a chopper circuit wherein when said detecting voltage exceed the wave height of said first to sixth electric signal, corresponding said semiconductor switching element is made non-conductive, magnetic energy accumulated in said excitation coil is discharged by means of said group of diode, and when said discharging current is reduced by a specified value, said semi-conductor switching element is energized again to hold the excitation current at the set value; and a means wherein when said excitation coil is discontinued of energizing at the end of said position detection signal, the magnetic energy accumulated in said excitation coil is changed to be accumulated as the magnetic energy means of said group of diode and said diode for preventing reverse current, said magnetic energy is quickly discharged and accumulated, thereby preventing a reduced torque and a counter torque from generating.

3. A reluctace type electric motor comprising:

a stationary armature having a two phase magnetic pole on which a two phase excitation coil is wound round;

a magnetic rotor wherein a plurality of salient pole opposing to said respective magnetic pole by means of small gap is arranged on the circumference and a rotating shaft is freely rotatably supported on a bearing;

a position detector comprising a position detecting element which detects the position of the salient pole of said magnetic rotor in order to obtain a first phase position detection signal composed of a first electric signal arranged with an electric signal of an inclined wave whose phase is delayed 360 degrees in order by an electrical angle, with the wave height of said electric signal of the inclined wave being increased with the lapse of time by a specified value at a 120 degree or 150 degree amplitude of an electrical angle, as well as a second phase position detection signal of the same waveform delayed respectively by a 180 degree electrical angle from said first electric signal; and a second phase position detection signal composed of a third and fourth electric signals whose phase is delayed respectively by a 90 degree electrical angle from said first and second electric signals having the same waveform as said first and second electric signals;

a set of two said semicomductor switching element connected to both ends respectively of a first to fourth excitation coil which composes a two phase excitation coil;

a DC power source which supplies power by a first and second diode for prevention of reverse current connected in forward direction to said first and third excitation coil and said second and fourth excitation coil by means of the one set of two semiconductor switching element which is connected to the first and third excitation coil of the first phase and the second and fourth excitation coil of the second phase;

a group of diode reversely connected to a serial connecting body of the excitation coil corresponding to one of said one set of two semiconductor switching element;

an energizing control circuit wherein said one set of two semiconductor switching element connected respectively to said first or fourth excitation coil is conducted by only an amplitude of said position detection signal by said first to fourth electric signal and respective said excitation coil is energized thereby obtaining an output torque;

a first and a second capacitors of small capacity connected to said first and second diode for reverse current prevention and to other input end with respect to an input terminal of said energizing control circuit;

a means wherein the arranging position of said position detecting element is adjusted and fixed so that power is supplied from said DC power source by only an amplitude of said position detection signal, in a section of 180 degree electrical angle where the output torque of respective said excitation coil is to be generated;

an electric circuit in which said first or fourth electric signal and a reference voltage are multiplied to obtain said first to fourth electric signal of an inclined wave having a wave height proportional to said reference voltage;

an excitation current detecting circuit which detects said first and third excitation coil and said second and fourth excitation coil respectively so as to obtain a first and second detecting voltage;

a chopper circuit wherein when said first detecting voltage exceeds the wave height of said first and second electric signal and when said second detecting voltage exceeds the wave height of said third and fourth electric signal, corresponding said semiconductor switching element is made non-conductive, magnetic energy accumulated in said excitation coil is discharged by means of said group of diode, and when said discharging current is reduced by a specified value, said semicondutor switching element is energized again to hold the excitation current at the set value; and a means wherein when said excitation coil is discontinued of energizing at the end of said position detection signal, the magnetic emergy accumulated in said excitation coil is temporarily charged and held in said first and second capacitors by means of said group of diode and said diode for reverse current prevention, then, said one set of two semiconductor switching element of said excitation coil to be energized is made conductive, changed and accumulated as the magnetic energy of said excitation coil, said magnetic energy is quickly discharged and accumulated, thereby preventing a reduced torque and a counter torque from generating.

4. A reluctance type electric motor comprising:

a stationary armature having a two phase magnetic pole on which a two phase excitation coil is wound round;

a magnetic rotor wherein plurality of salient pole opposing to said respective magnetic pole by means of small gap is arranged on the circumference and a roting shaft is freely rotatably supported on a bearing;

a position detector comprising a position detecting element which detects the position of the sailent pole of said magnetic rotor in order to obtain a first phase position detection signal composed of a first electric signal arranged an electric signal of a rectangular wave whose phase is delayed 360 degrees in order by an electrical angle, and at a 120 degree to 150 degree amplitude of an electrical angle, as well as a second phase position detection signal composed of a third and fourth electric signal whose phase is delayed respectively by a 90 degree electrical angle from said first and second electric signals having the same waveform as said first and second electric signals;

a set of two semiconductor switching element connected to both ends respectively of a first to fourth excitation coil which composes a two phase excitation coil;

a DC power source which supplies power by a first and second diode for prevention of reverse current connected in forward direction to said first and third excitation coil and said second and fourth excitation coil by means of said one set of two semiconductor switching element which is connected to the first and third excitation coil of the first phase and the second and fourth excitation coil of the second phase;

a group of diode reversely connected to a serial connecting body of the excitation coil corresponding to one of said one set of two semiconductor switching element;

an energizing control circuit wherein said one set of two semiconductor switching element connected respectively to said first to fourth excitation coil is conducted by only an amplitude of said position detection signal by said first or fourth electric signal and respective said excitation coil is energized thereby obtaining an output torque;

a first and a second capacitors of small capacity connected to said first and second diode for reverse current prevention and to other input end with respect to an input terminal of said energizing control circuit;

a means wherein the arranging position of said position detecting element is adjusted and fixed so that power is supplied from said DC power source by only an amplitude of said position detection signal from the starting portion of a section of 180 degree electrical angle where the output torque of respective said excitation coil is to be generated;

a means which adjusts so that a torque curve having a peak output torque exists in the front half portion in a section of b 180 degree elecrtrical angle; and a means wherein when said excitation coil is discontinued of energizing at the end of said position detection signal, the magnetic energy accumulated in said excitation coil is temporarily charged and held in said first and second capacitors by means of said group of diode and said diode for reverse current prevention, then, said one set of two semiconductor switching element of said excitation coil to be energized is made conductive, changed and accumulated as the magnetic energy of said excitation coil, sand magnetic energy is quickly discharged and accumulated, thereby preventing a reduced torque and a counter torque from generating.

* * * * *

UNITED STATES PATENT AND TRADEMARK OFFICE
CERTIFICATE OF CORRECTION

PATENT NO. : 5,097,191

DATED : March 17, 1992

INVENTOR(S) : Itsuki Bahn

It is certified that error appears in the above-identified patent and that said Letters Patent is hereby corrected as shown below:

Col 1, line 45, "exitation" should be --excitation--.

Col. 2, line 23, "secon" should be --second--.

Col. 5, line 7, "cirectional" should be --directional--; and line 58, "largy" should be --largely--.

Col. 6, line 3, "composed" should be --composes--;

line 42, "leaming" should be --leaning--; and line 49, "as" should be --a--.

Col. 8, line 2, "sircuit" should be --circuit--; and line 56, "degital" should be --digital--.

Col. 9, line 18, "linclined" should be --inclined--; and line 64, "couter" should be --counter--.

Col. 13, line 11, "at" should be --as--; and line 53, "excitationcoil" should be --excitation coil--

UNITED STATES PATENT AND TRADEMARK OFFICE
CERTIFICATE OF CORRECTION

PATENT NO. : 5,097,191
DATED : March 17, 1992
INVENTOR(S) : Itsuki Bahn

It is certified that error appears in the above-identified patent and that said Letters Patent is hereby corrected as shown below:

Col. 14, line 5, "7a, 7a, 7b, 7b" should be --7a, 7a, 7b, 7b--;

line 12, "tereby" should be --thereby--;

line 31, "votlage" should be --voltage--; and line 51, "surve" should be --curve--.

Col. 15, line 2, "7a, 7a, 7b, 7b" should be --7a, 7a, 7b, 7b--;

line 4, "7a, 7a" should be --7a, 7a--;

line 5, "7b" should be --7b--;

line 9, "7a" should be --7a-- (second occurrence);

line 13, "7b, 7b" should be --7b, 7b--;

line 30, "trovided" should be --provided--;

line 42, "prosessed" should be --processed--; and line 60, "positaion" should be --position--.

UNITED STATES PATENT AND TRADEMARK OFFICE
CERTIFICATE OF CORRECTION

PATENT NO. : 5,097,191
DATED : March 17, 1992
INVENTOR(S) : Itsuki Bahn

It is certified that error appears in the above-identified patent and that said Letters Patent is hereby corrected as shown below:

Col. 16, line 25, "disahrged" should be --discharged--;

line 53, "emboment" should be --embodiment--; and line 59, "excitaion" should be --excitation--.

Col. 18, line 26, "thant" should be --than--.

Col. 19, line 16, delete "is"; and line 61, change "hahalf" to --half--.

Col. 20, line 25, "nergizing" should be --energizing--.

Col. 21 (Claim 1), line 19, "srmature" should be --armature--;

(Claim 1), line 22, "slinet" should be --salient--; and (Claim 1), line 41, "fourthe" should be --fourth--.

Col. 22 (Claim 2), line 37, "rotar" should be --rotor--.

UNITED STATES PATENT AND TRADEMARK OFFICE
CERTIFICATE OF CORRECTION

PATENT NO. : 5,097,191
DATED : March 17, 1992
INVENTOR(S) : Itsuki Bahn

It is certified that error appears in the above-identified patent and that said Letters Patent is hereby corrected as shown below:

Col. 23, line 9, "fixth" should be --fifth--;

line 10, "six" should be --sixth--;

line 11, "diode" should be --diodes--; and line 57, "reluctace" should be --reluctance--.

Col. 24, line 42, "capacitors" should be --capacitor--.

Col. 26, line 19, "capacitors" should be --capacitor--; and line 34, delete "b".

Signed and Sealed this

Twenty-third Day of November, 1993

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,097,191

DATED : March 17, 1992

INVENTOR(S) : Itsuki Bahn

It is certified that error appears in the above-identified patent and that said Letters Patent is hereby corrected as shown below:

TITLE PAGE [30], "63-112127" should be --1-112127--.

Signed and Sealed this

Twenty-first Day of December, 1993

Attest:

BRUCE LEHMAN

Attesting Officer         Commissioner of Patents and Trademarks